US008872386B2

(12) United States Patent
Mach et al.

(10) Patent No.: US 8,872,386 B2
(45) Date of Patent: Oct. 28, 2014

(54) INDUCTIVE POWER TRANSMISSION SYSTEM AND METHOD FOR CONCURRENTLY TRANSMITTING DIGITAL MESSAGES

(71) Applicant: Powermat Technologies, Ltd., Neve Ilan (IL)

(72) Inventors: Elieser Mach, Rosh Tzurim (IL); Arik Rofe, Jerusalem (IL); Oola Greenwald, Mevasseret Zion (IL); Guy Raveh, Mataa (IL); Oz Moshkovich, Rehovot (IL); Ian Podkamien, Petach Tikva (IL); Yuval Koren, Rehovot (IL); Rinat Burdo, Jerusalem (IL)

(73) Assignee: Powermat Technologies, Ltd., Neve Ilan (IL)

( * ) Notice: Subject to any disclaimer, the term of this patent is extended or adjusted under 35 U.S.C. 154(b) by 0 days.

(21) Appl. No.: 14/270,523

(22) Filed: May 6, 2014

(65) Prior Publication Data

US 2014/0239732 A1 Aug. 28, 2014

Related U.S. Application Data

(63) Continuation of application No. PCT/IB2013/002288, filed on Oct. 11, 2013.

(60) Provisional application No. 61/712,290, filed on Oct. 11, 2012.

(51) Int. Cl.
*H01F 27/42* (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

| 2008/0197802 | A1 | 8/2008 | Onishi et al. |
| 2009/0079269 | A1 | 3/2009 | Jin |
| 2011/0062793 | A1 | 3/2011 | Azancot et al. |
| 2012/0193993 | A1 | 8/2012 | Azancot et al. |

FOREIGN PATENT DOCUMENTS

| WO | 2008/114268 A2 | 9/2008 |
| WO | 2010/080737 A1 | 7/2010 |
| WO | 2010/131732 A1 | 11/2010 |
| WO | 2011/135571 A2 | 11/2011 |

OTHER PUBLICATIONS

International Search Report dated Mar. 25, 2014 for corresponding Application PCT/IB2013/002288 filed Oct. 11, 2013.

*Primary Examiner* — Robert L. Deberadinis
(74) *Attorney, Agent, or Firm* — Brooks Kushman P.C.

(57) ABSTRACT

An inductive power receiver including a resonant circuit, a rectifier, a rectified current sense, and a communication and control unit includes a communications modulator and at least one signal generator operable to generate a set of communication signals including a series of pulses generated at characteristic frequencies. Communication signals provide instructions for an inductive power outlet to regulate power transfer to the inductive power receiver.

27 Claims, 31 Drawing Sheets

| Rx | | Tx Reaction |
|---|---|---|
| Message | Modulation frequency | |
| Standby Phase | | |
| – | – | <<Tx monitors the surface>> |
| Digital Ping Phase | | |
| P-DOWN | 8kHz | <<Generates digital ping>> |
| Identification Phase | | |
| <MsgBit> | <6kHz> | Reads logic "0" of the RXID message |
| <P-SAME> | <500Hz> | Reads logic "1" of the RXID message |
| Power transfer Phase | | |
| <P-DOWN> | <8kHz> | Decrease operation frequency (increase power) |
| <P-UP> | <1kHz> | Increase operation frequency (decrease power) |
| <P-SAME> | <500kHz> | Keep operation frequency |
| <END-SIG> | <250kHz> | Stop power delivery |
| End of charge Phase | | |
| – | – | <Sleep for $t_{sleep}$ hours and monitor surface to detect Rx removal> |

FIG.14

| Min distance between Tx coil and charger Surface [mm](Zaxis*) | Max distance between Tx coil and charger Surface [mm](Zaxis*) | Active area on Tx Surface**[mm] |
|---|---|---|
| 1.4 | 1.6 | 3.0 |

**A complaint Rx is required to be able to charge properly at every distance inside the defined range(between the Min. and the Max.values).
**Active area is defined as the maximal possible misalignment between the Tx and the Rx coils. misalignment is measured between the coils coils centers.

FIG.16A

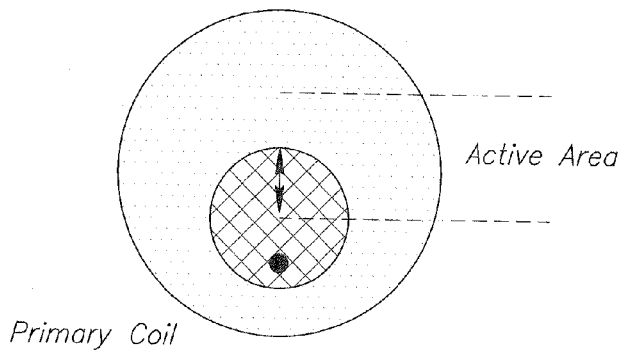

FIG.16B

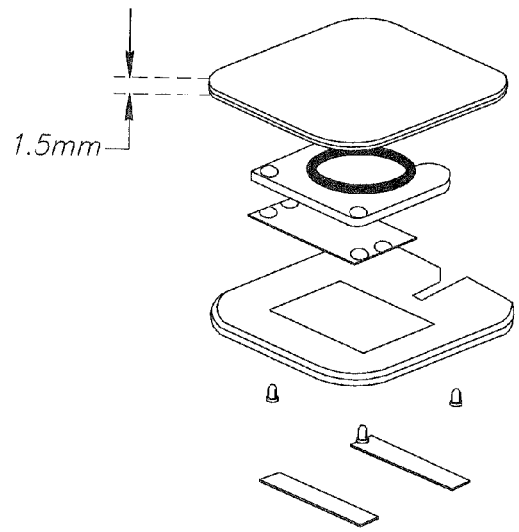

FIG.17

| Parameter | Comments | Min | Target | Max | Units |
|---|---|---|---|---|---|
| Coil Self-inductance | 1 Vac&300kHz (measured attached to 40mm circular ferrite with 1.5mm magnet) | 14.915 | 15.7 | 16.485 | µH |
| Coil's Shape | Circle | | | | |
| Outer diameter | | 34.3 | 34.5 | 34.7 | mm |
| Inner diameter | | 21 | 22 | 23 | mm |
| Wire diameter | | 0.3 | 0.4 | 0.5 | mm |
| Turn per layer | 15 | | | | |
| Layers | 1 | | | | |

FIG.18

| Parameter | Symbol | Min | Target | Max | Units |
|---|---|---|---|---|---|
| Primary Self-inductance | $L_p$ | 14.915 | 15.7 | 16.485 | µH |
| Series capacitance | $C_p$ | 40 | 44 | 48 | nF |

FIG.19

| Parameter | Min | Target | Max | Units |
|---|---|---|---|---|
| Input voltage | 17.7 | 18 | 18.3 | V |
| Input current(per access point) | | | 0.5 | Amp. |
| Frequency range | 227 | | 278 | kHz |

FIG.20

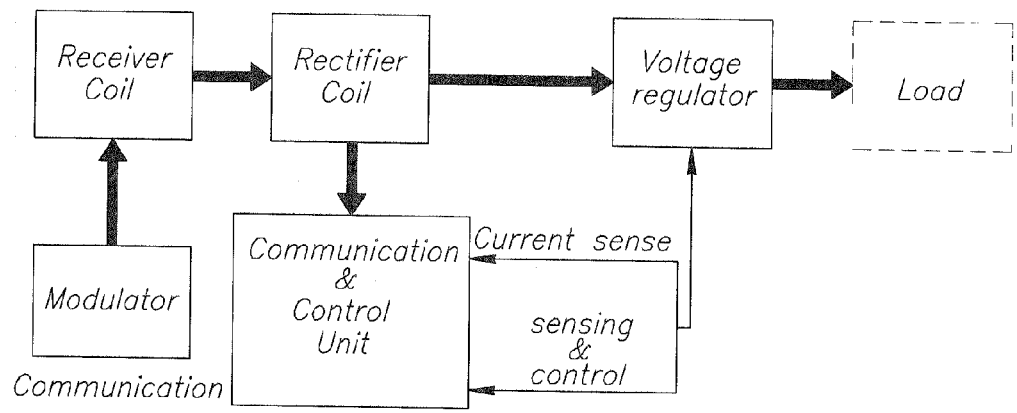
FIG.21
| Parameter | Symbol | Min | Target | Max | Units |
|---|---|---|---|---|---|
| Lowest operational frequency | $F_{min}$ | | | 190 | kHz |
| Highest operational frequency | $F_{max}$ | 300 | | | kHz |
| Receiver operational frequency | $F_{res}$ | | | 170 | kHz |
FIG.22
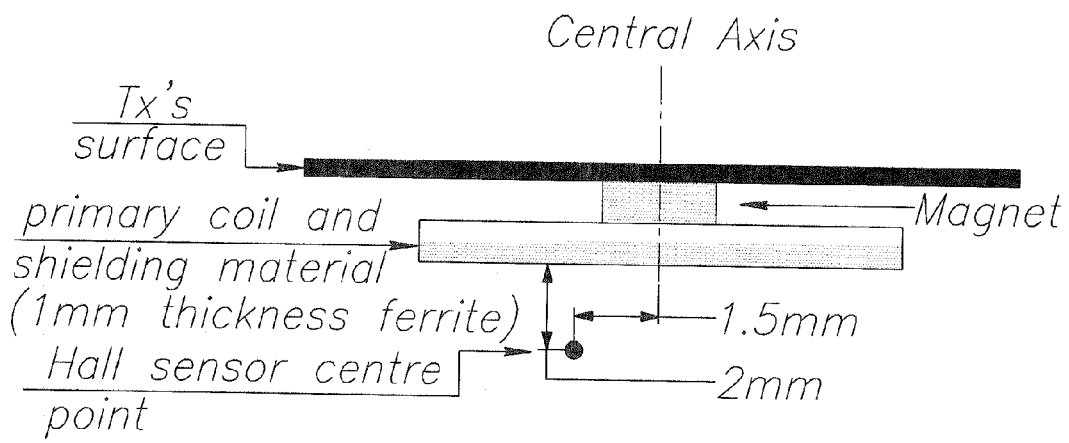
FIG.23

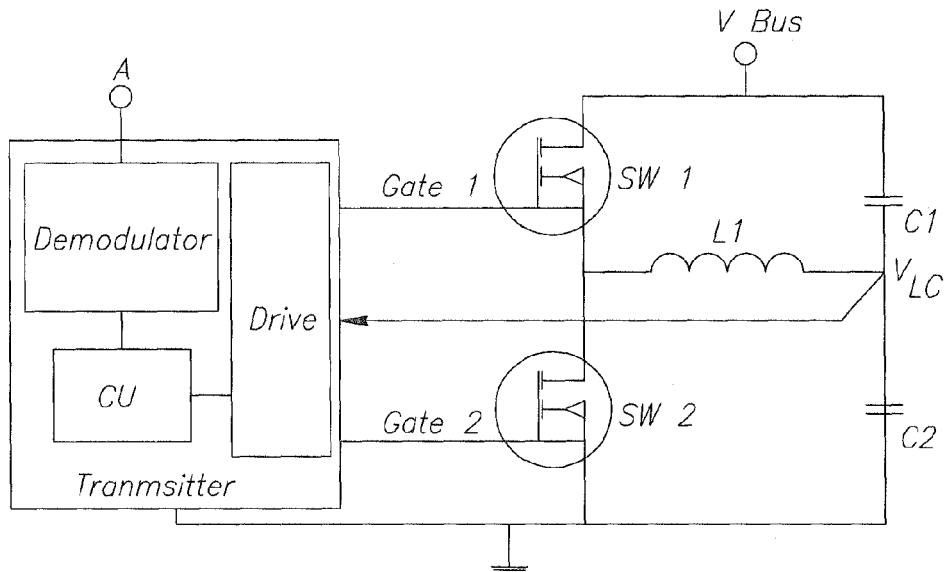
FIG.24
| $F_{pulse}$ | $D_{pulse}$ | $N_{pulse}$ | $N_{pinging}$ | $Delta_{pulse}$ |
|---|---|---|---|---|
| 175kHz | 10% | 2 | 250ms | 3V |
FIG.25
| Parameter | Symbol | Value | Units |
|---|---|---|---|
| Modulation depth | $\Delta_{min}$ | 1.5 | V |
| Minimal Mod state time | $t_{smin}$ | 9 | $\mu s$ |
| Maximal Mod state time | $t_{smax}$ | 50 | $\mu s$ |
| Maximal NoMod to Mod transition time | $T_{tran}$ | 20 | $\mu s$ |
FIG.26A
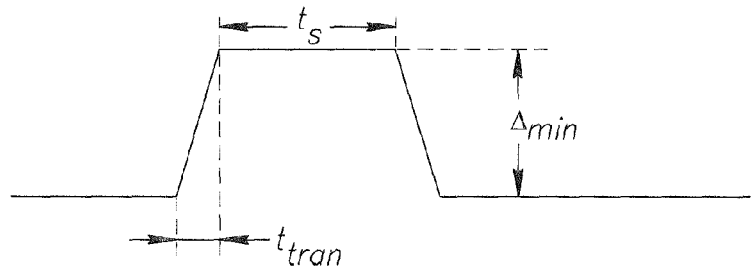
FIG.26B

| Symbol name | High period(HP) duration (μs) | Low period(LP) duration (μs) | Total Time(μs) | Frequency/Tolerance |
|---|---|---|---|---|
| S1 | $t_{S1}$ | $125-t_{S1}$ | 125 | 8kHz(±800Hz) |
| S2 | $t_{S2}$ | $1000-t_{S2}$ | 1000 | 1kHz(±100Hz) |
| S3 | $t_{S3}$ | $2000-t_{S3}$ | 2000 | 500Hz(±50Hz) |
| S4 | $t_{S4}$ | $4000-t_{S4}$ | 4000 | 250Hz(±25Hz) |
| S5 | $t_{S5}$ | $166-t_{S5}$ | 166 | 6kHz(±600Hz) |
| S6* | $t_{S6}$ | $250-t_{S6}$ | 250 | 4kHz(±400Hz) |

FIG.27

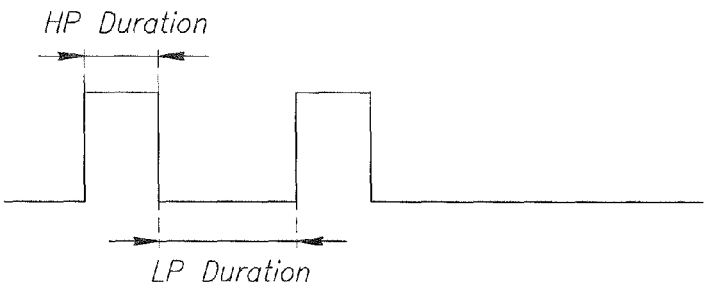

FIG.28

| Symbol name | Signal name | Meaning | Expected outcome |
|---|---|---|---|
| S1 | P-Down | During Digital ping phase- acknowledgment to the Tx During power Transfer- Decrease operation frequency | In Digital ping phase- continues to next phase In Power Transfer phase-increase delivered power |
| S2 | P-Up | Increase operation frequency | Decrease delivered power |
| S3 | P-Same | During Power transfer phase -keep operation frequncy During identification phase- logic "1" bit | Keep power level stable |
| S4 | END-SIG | End of Charge | Stop delivered power |
| S5 | MsgBit | Logic "0" bit currently used for identification phase | ID validation, Keep power Stable |
| S6* | SPARE | | Ignore, Keep power level stable |

FIG.29

| Parameter | Symbol | Min | Target | Max | Units |
|---|---|---|---|---|---|
| Identification signal period upon entering the digital ping phase | $t_{Identification}$ | 28 | 30 | 35 | ms |
| Time from Digital ping start until first signal sent by receiver | $F_{Start}$ | | | 15 | ms |
| Time from power removal until receiver is ready to detect new ping | $F_{recover}$ | | | 20 | ms |
FIG.30
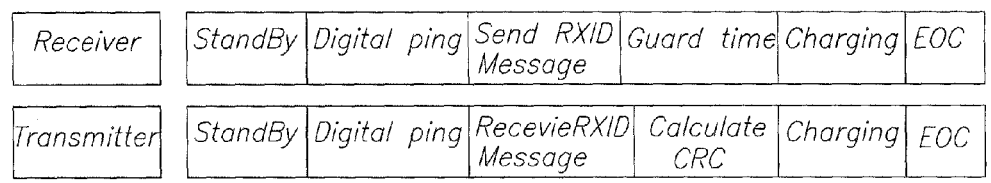
FIG.31
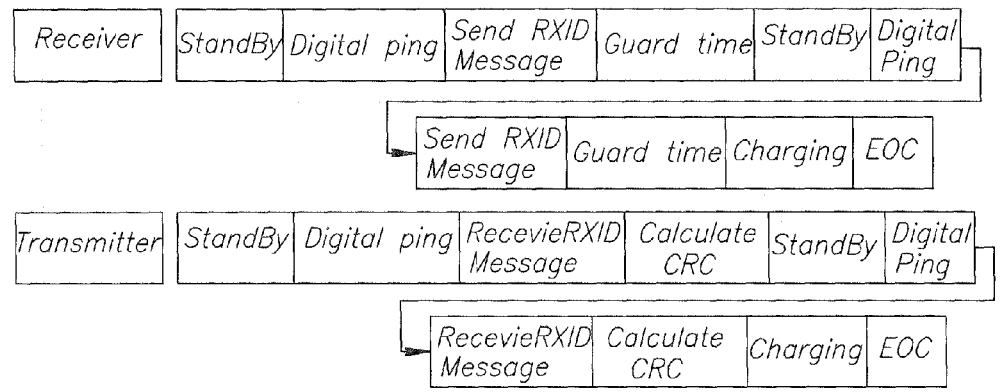
FIG.32
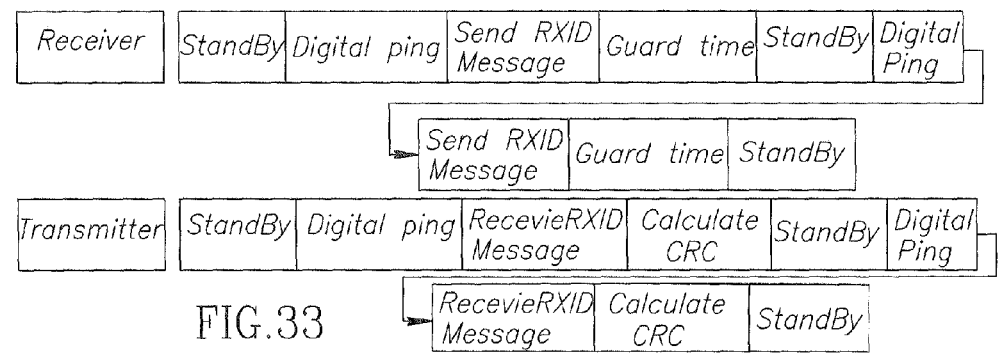
FIG.33

| Parameter | Symbol | Min | Max | Units |
|---|---|---|---|---|
| Stabilization procedure maximal duration | $F_{stab}$ | | 180 | ms |
| Time for end of identification string transmission until receiver moves to power transfer phase | $F_{guard}$ | 20 | | ms |
FIG.34
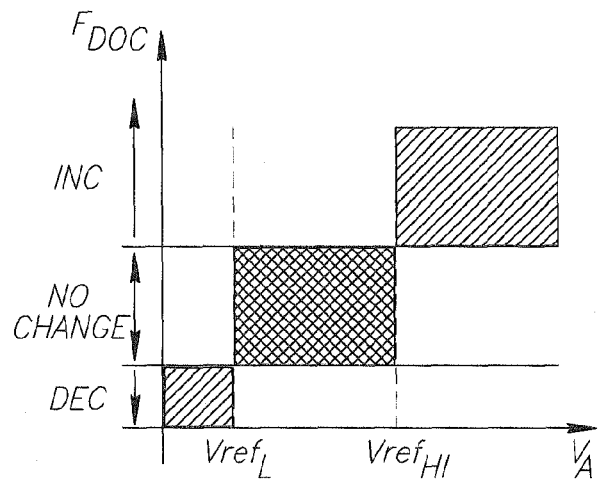
FIG.35
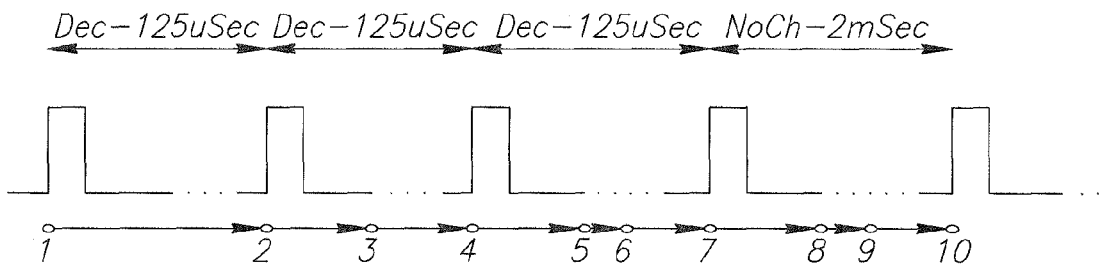
FIG.36A

| Point | Time (μsec) | Activity |
|---|---|---|
| 1 | 0 | Receiver send a pulse |
| 2 | 125 | Receiver terminates signals as a P-Down signal by sending the next pulse after 125μsec. The transmitter Detects the P-Down signal on the rising edge of the next signal. The Tx decimates every two P-Down signal and therefore does not change the frequency. |
| 3 | 175 | 50μsec from the end of P-Down signal, the Rx starts measuring the change in voltage/frequncey |
| 4 | 250 | As the Rx has not completed measurement, it continues with P-Down signal, and send a new pulse after 125μsec (P-Down). Tx detects the second P-Down signal and starts changing the frequency. |
| 5 | 300 | Within 50μsec the frequency change has been performed by Tx. The Rx starts measuring the voltage/frequency. |
| 6 | 325 | The previous measurement has been completed by Rx, and as most of it did not show a change, the Rx will continues to send P-Down |
| 7 | 375 | Rx send another pulse that marks the third P-Down signal(as result in 6 was that change was not performed yet). Tx detects the P-Down, but does not change as it is decrementing by 2. |
| 8 | 425 | Rx starts next measurement period |
| 9 | 450 | The second measurement of Rx has been completed, the Rx senses that the frequency change was performed and no further P-Down are required |
| 10 | 2375 | The Rx sends a pulse after a 2 sec period that marks P-Same signal, Tx detects the P-same and does not change frequency. |

FIG.36B

| Parameter | Symbol | Min | Target | Max | Units |
|---|---|---|---|---|---|
| Max. period in Power transfer phase before transmitting a P-End signal | $t_{EOC}$ | | 30 | 40 | minutes |
| Change completed threshold current | $I_{CC}$ | $0.05 \times I_{max}$ | | | mA |
| No Load threshold currnet | $I_{NoLoad}$ | | | 25 | mA |
| Time to enter No load EOC | $t_{NoLoad\_EOC}$ | | 40 | | se |
| Maximum receiver temperature | $T_{Rx\_max}$ | | | 60 | °c |

FIG.37

FIG.38

| Parameter | Symbol | Min | Target | Max | Units |
|---|---|---|---|---|---|
| Transition time between standby phase and Digital ping phase | $t_{PMA1\_SB2DP}$ | 180 | 200 | 250 | Ms |
| Digital Ping maximum frequncy | $t_{PM1\_ping\_max}$ | 470 | 476 | 480 | kHz |
| Minimum frequency of the first frequency sweep | $t_{PMS1\_ping\_min1}$ | 256 | 263 | 270 | kHz |
| Minimum frequency of the Second frequency sweep | $t_{PMS1\_ping\_min2}$ | 228 | 232 | 236 | kHz |
| Minimum frequency of the Second frequency sweep— 4th retry onward. | $t_{PMS1\_ping\_min3}$ | 224 | 272 | 230 | kHz |
| Duration of first sweep. | $t_{PMA1\_sweep1}$ | 1.7 | 1.8 | 1.9 | ms |
| Duration of Second sweep. | $t_{PMA1\_sweep2}$ | 0.45 | 0.5 | 0.55 | ms |
| Waiting period after sweep1 | $t_{PMA1\_sweep\_wait1}$ | 6.3 | 6.5 | 6.7 | ms |
| Waiting period after sweep2 | $t_{PMA1\_sweep\_wait2}$ | 6.3 | 6.5 | 6.7 | ms |
| Maximal time window for response | $t_{PMA1\_response}$ | 5 | 6 | 6.5 | ms |
| Delay time period successive pings | $t_{PMA1\_retry}$ | 30 | 250 | 300 | ms |
| Number of retires ping | $N_{PMA1\_ping}$ | 5 | | | |
| Transition time between Digital ping phase and power transfer Phase | $t_{DP2PT}$ | 0.001 | | 1 | ms |

FIG.39

| Parameter | Symbol | Min | Target | Max | Units |
|---|---|---|---|---|---|
| Power transfer maximal operation frequency | $f_{op\_max}$ | 275 | 278 | 282 | kHz |
| Power transfer minimal operation frequency | $f_{op\_min}$ | 230 | 232* | 234 | kHz |
| Sequential PMA Dec cycle before removing the power signal | $N_{over\_dec}$ | 100 | 200 | 1000 | cycle |
| Data Timeout | $t_{response}$ | 6.45 | 6.5 | 6.55 | ms |
| Sequential a P-End cycle before removing the power signal | $N_{EOC}$ | | 6 | | cycle |
| EOC phase sleep time after EOC request | $T_{sleep}$ | | 4 | | hours |
| Input Voltage | $V_{in}$ | 17.5 | 18 | 19 | Volts |
| Transmitters temperature | $T_{Tx}$ | 0 | – | 50 | Celsius |
| Primary coil peak Voltage | $V_{peak}$ | – | – | 42 | Volt |
| Operation frequency adjustment time Window | $t_{adjust}$ | | | 10 | μs |

*Since in the 4th ping onward the Digital ping minimum frequency is lower than $f_{op\_min}$, if a receiver was identified, the transmitter will raise the operation frequency to $f_{op\_min}$ before continuing to the Power Transfer phase.

FIG.40

| Parameter | Symbol | Min | Target | Max | Units |
|---|---|---|---|---|---|
| Operation frequency step | $t_{step}$ | 1.2 | 1.5 | 1.8 | kHz |
| Power transfer minimal operation frequency | $t_{small\_step}$ | 0.1 | 0.2 | 0.25 | kHz |

FIG.41

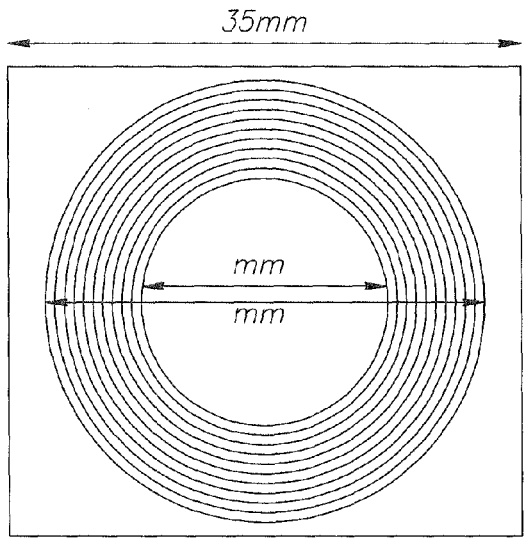
FIG.42
| Parameter | Comments | Min | Target | Max | Units |
|---|---|---|---|---|---|
| Outer diameter | | 32.9 | 33 | 33.1 | mm |
| Inner diameter | | 19.9 | 20 | 20.1 | mm |
| Net width | | 38 | 40 | 42 | mil |
| space between nets | | | 15 | | mil |
| Turn per layer | | | 4.5 | | |
| Layers | Top and bottom | | 2 | | |
| Copper thickness | | | 2 | | Oz |
| PCB thickness | | 0.36 | 0.4 | 0.44 | mm |
FIG.43
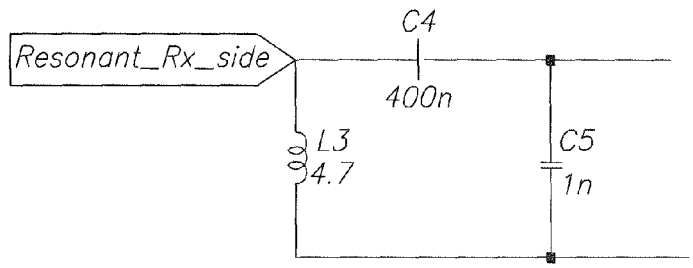
FIG.44

| Parameter | Comments | Min | Target | Max | Units |
|---|---|---|---|---|---|
| Coil self induction | | 2.7 | 3 | 3.3 | µH |
| Coil self induction with ferrite | L3 | 4.2 | 4.7 | 5.2 | µH |
| Self coil resistance | | 285 | 300 | 315 | mOhm |
| Self capacitor | C4 | 380 | 400 | 420 | nF |
| Parallel capacitor | C5 | 0.95 | 1 | 1.05 | nF |

Remarks:
1. Material must be RoHS compliant.
2. Manufacturer EmIcore.
3. Material:M79
4. Dimension with * are critical dimensions.

INDUCTIVE POWER TRANSMISSION SYSTEM AND METHOD FOR CONCURRENTLY TRANSMITTING DIGITAL MESSAGES

CROSS-REFERENCE TO RELATED APPLICATIONS

This application is a continuation of PCT/IB2013/002288 filed Oct. 11, 2013, which, in turn, claims the benefit of U.S. provisional application Ser. No. 61/712,290 filed Oct. 11, 2012, the disclosures of which are hereby incorporated in their entirety by reference herein.

FIELD OF THE INVENTION

The present invention is directed to providing energy efficient inductive power transfer. More specifically, the present invention relates to inductive power transfer systems and methods incorporating activation and termination mechanisms.

BACKGROUND OF THE INVENTION

The efficient use of available energy is of great importance for a number of reasons. On a global scale, there is increasing concern that the emission of greenhouse gases such as carbon dioxide from the burning of fossil fuels may precipitate global warming. Moreover, energy resources are limited. The scarcity of global energy resources alongside geopolitical factors drives the cost of energy upwards. Thus efficient use of energy is an ever more important budget consideration for the energy consumer.

Energy losses in electrical energy transmission are chiefly due to the incidental heating of current carrying wires. In many cases this is unavoidable, as current carrying wires are essential for the powering of electrical devices and current carrying wires have resistance. It is the work done to overcome this resistance which generates heat in the wires.

In other cases the energy losses are unnecessary. For example, electrical devices are often left running unnecessarily and energy used to power devices which are not being used is truly wasted. Various initiatives aimed at reducing the amount of energy wasted by idle devices have been proposed. For example, Energy Star is a joint program of the United States Environmental Protection Agency and the United States Department of Energy which awards manufacturers the right to display a recognizable label on products which meet certain energy consumption standards. Energy Star attempts to reduce energy consumption through better energy management.

Efficient energy management reduces energy wastage. For example, laptop computers, which rely upon a limited amount of energy supplied from onboard power cells, use a variety of strategies for keeping power consumption to a minimum. Thus the screen and hard drives are switched off automatically after the computer has been left inactive for a significant length of time, similarly the network card may be disabled when the computer is disconnected from the mains or from a network. Such energy management strategies may serve to increase the length of time that a device can be powered by its onboard cells.

Even when connected to the mains, however, efficient use of energy is essential. Many common electrical devices run on low voltage DC and typically use a transformer with an AC-DC power adapter to control the power provided to it. Energy Star estimates that 1.5 billion such power adapters are used in the United States alone for devices such as MP3 players, Personal Digital Assistants (PDAs), camcorders, digital cameras, emergency lights, cordless and mobile phones. According to Energy Star, such power adapters draw about 300 billion kilowatt-hours of energy every year which is approximately 11% of the United States' national electric bill.

If multiple devices could be run from a single power adapter this would greatly reduce the number of power adapters in use. However, the supply of electricity to a number of devices through a single cable is not trivial. The more devices that are connected to a single power strip the greater the current which is drawn by the strip. Thus the current supplied through the single cable connecting the power strip to the mains increases.

Power losses due to the heating of a cable increase according to the square of the current it carries so energy losses from the cable may increase parabolically. Furthermore, in the absence of effective energy management, if too many devices draw current from a single cable the current supplied may exceed the permitted level thereby tripping a circuit breaker or blowing a fuse. Even more seriously, the excessive current may lead to overheating of the cable which is a common cause of fire.

A further unnecessary usage of energy is in powering of devices having onboard power cells. When an electric device having rechargeable cells such as a laptop computer, electric shaver or the like, is connected to the mains power is drawn both to operate the device and also to recharge the cells. Although electrical cells do need to be recharged periodically, even partially charged cells are sufficient to power the device. It is unnecessary therefore to continuously charge the onboard cell.

Furthermore, the energy needlessly consumed charging electrical cells beyond the level necessary for operation of a device increases electricity bills. This is of particular concern where a large number of such devices are being used simultaneously. For example for a company which hosts a meeting or a conference where many individual laptop computers are being used simultaneously.

Inductive power coupling allows energy to be transferred from a power supply to an electric load without a wired connection therebetween. An oscillating electric potential is applied across a primary inductor. This sets up an oscillating magnetic field in the vicinity of the primary inductor. The oscillating magnetic field may induce a secondary oscillating electrical potential in a secondary inductor placed close to the primary inductor. In this way, electrical energy may be transmitted from the primary inductor to the secondary inductor by electromagnetic induction without a conductive connection between the inductors.

When electrical energy is transferred from a primary inductor to a secondary inductor, the inductors are said to be inductively coupled. An electric load wired in series with such a secondary inductor may draw energy from the power source wired to the primary inductor when the secondary inductor is inductively coupled thereto.

The strength of the induced voltage in the secondary inductor varies according to the oscillating frequency of the electrical potential provided to the primary inductor. The induced voltage is strongest when the oscillating frequency equals the resonant frequency of the system. The resonant frequency $f_R$ depends upon various factors, such as the inductance L and the capacitance C of the system according to the equation $$f_R \approx \frac{1}{2\pi\sqrt{LC}}.$$

Known inductive power transfer systems typically transmit power at the resonant frequency of the inductive couple. This can be difficult to maintain as the resonant frequency of the system may fluctuate during power transmission, for example in response to changing environmental conditions or variations in alignment between primary and secondary coils.

Amongst others, one problem associated with resonant transmission is the high transmission voltages involved. At high operating voltages, a large amount of heat may be generated by the system resulting in high power losses as well as damage to heat sensitive components. Accordingly, capacitors and transistors in the resonant circuits may need to be relatively large.

The need remains therefore for an energy efficient inductive power transfer system which may incur lower power losses during operation. The current disclosure addresses this need.

SUMMARY OF THE INVENTION

According to various embodiments an inductive power receiver is introduced which is configured to draw power from an inductive power outlet or transmitter. The inductive power receiver includes: a resonant circuit comprising a secondary coil configured to inductively couple with a primary coil of the inductive power outlet, the resonant circuit having a characteristic resonant peak at a frequency lower than an operational frequency of the inductive power outlet such that operating at a higher frequency reduces the amount of power transferred; a rectifier; a rectified current sense; a communication and control unit operable to communicate power control instructions to an inductive power outlet comprising: at least one communications modulator operable to create at least a first state and a second state such that transitioning from the first state to the second state produces a detectable change at the primary coil; and at least one signal generator operable to generate communication signals comprising a series of pulses generated at a characteristic frequency f, each the pulse comprising a fixed duration $t_s$ of high logical state followed by a second duration $(1/f-t_s)$ of low logical state, and wherein the communication and control unit is operable to select a communication signal from at least one of a set of communication signals comprising: a P-DOWN signal having a characteristic frequency of 8 kHz, a P-UP signal having a characteristic frequency of 1 kHz, a P-SAME signal having a characteristic frequency of 500 Hz, an END-SIG signal having a characteristic frequency of 250 Hz, a MsgBIT signal having a characteristic frequency of 6 kHz, and optionally a SPARE signal having a characteristic frequency of 4 kHz. Optionally, the characteristic resonant frequency is less than 115 kilohertz.

Variously, the inductive power receiver may further comprise a temperature regulation module, an alignment mechanism, a detection mechanism configured to trigger the inductive power outlet. Optionally, the detection mechanism comprises at least one magnetic material detectable by a Hall Effect sensor. Optionally, again, the detection mechanism comprises at least one magnetic material selected such that when the inductive power receiver is placed adjacent to a surface, a 40 Gauss difference in magnetic field is detectable by a Hall Effect sensor situated 2 millimeters behind the surface and within a radius of 4 millimeters.

Variously, the detection mechanism is operable to respond to a digital ping by transmitting a P-DOWN signal having a characteristic frequency of 8 kHz. Additionally or alternatively, the detection mechanism is operable to respond to a digital ping by transmitting an END-SIG signal if an end-of-charge condition is detected.

Optionally, the communications modulator is selected from at least one of an ancillary resistor and an ancillary capacitor.

According to one aspect of the disclosure an inductive power outlet is presented for transmitting power to at least one inductive power receiver. The inductive power outlet comprises at least one primary inductor wired to a power supply, the primary inductor for forming an inductive couple with at least one secondary inductive coil associated with the inductive power receiver; and at least one driver configured to provide an oscillating voltage across the primary inductor.

The inductive power receiver may comprise the at least one secondary inductive coil; and an output regulator operable to monitor induced voltage across the secondary inductive coil; to detect an activation voltage pulse; to compare the induced voltage with at least one threshold value; to send at least one instruction signal to the inductive power outlet; and to provide power to an electric load.

The inductive power outlet may be operable to induce an activation voltage pulse across the secondary inductive coil of the inductive power receiver thereby initiating the inductive power receiver to send an identification signal to the inductive power outlet and to start drawing power therefrom.

Optionally, the inductive power receiver further comprises a signal transmission circuit operable to generate the at least one instruction signal. The transmission circuit may comprise at least one ancillary load selectively connectable to the secondary inductor by a switching unit, wherein the switching unit is configured to connect the ancillary load to the secondary inductor with a characteristic frequency thereby producing a pulse of detectable peaks in primary voltage or primary current having the characteristic frequency.

Optionally, the at least one instruction signal comprising a pulse may have a characteristic frequency of peaks in primary voltage or primary current, wherein the inductive power outlet further comprises: at least one peak detector configured to detect the peaks; and at least one processor operable to determine the characteristic frequency of the peaks.

In other embodiments, the outlet further comprises a signal detector operable to detect the instruction signals and the driver is operable to perform at least one function selected from a group consisting of: selecting a first operating power if the signal detector detects a first instruction signal; selecting a second operating power if the signal detector detects a second instruction signal; increasing operating power by a first increment if the signal detector detects a third instruction signal; increasing operating power by a second increment if the signal detector detects a fourth instruction signal; decreasing operating power by a first increment if the signal detector detects a fifth instruction signal; decreasing operating power by a second increment if the signal detector detects a sixth instruction signal; continuing to provide the oscillating voltage across the primary inductor at same power if the signal detector detects a seventh instruction signal; and ceasing to provide the oscillating voltage across the primary inductor if the signal detector detects an eighth instruction signal.

The inductive power outlet may further comprise a trigger sensor configured to detect a release signal indicating proximity of a possible inductive power receiver.

Optionally, the activation voltage pulse comprises an induced voltage across the secondary inductive coil of at least eight volts. Where appropriate, the activation voltage pulse produces a current of at least three milliamps.

According to a further aspect of the disclosure an inductive power receiver is presented for receiving power from at least one inductive power outlet. The inductive power receiver may comprise at least one secondary inductor for forming an inductive couple with at least one primary inductive coil; and at least one signal transmission circuit configured to generate at least one instruction signal, the instruction signal being detectable by a signal detector associated with the inductive power outlet as a pulse having a characteristic frequency of peaks in primary voltage or primary current. Where required, the inductive power outlet may be configured to drive an oscillating voltage across the primary inductive coil for a limited time duration and to stop driving the oscillating voltage if no instruction signal is received during the time duration; and the transmission circuit may be operable to send at least one instruction signal to the inductive power outlet during each the time duration.

Optionally, the time duration is between five milliseconds and ten milliseconds.

In some embodiments, at least one instruction signal comprises a termination signal and the inductive power outlet is operable to cease driving the primary inductive coil when the termination signal is detected.

Where appropriate, the transmission circuit may comprise a signal generator operable to generate at least one instruction signal having a characteristic frequency selected from at least one of a group consisting of: 250 hertz, 500 hertz, 1 kilohertz, from 1.5 kilohertz to 5 kilohertz and 8 kilohertz.

Optionally, the inductive power receiver further comprises an output regulator operable to monitor induced voltage across the secondary inductor; to compare the induced voltage with at least one threshold value; and to provide power to an electric load. The output regulator may be further operable to generate at least one instruction signal selected from a group consisting of: an initial pulse of approximately one kilohertz to instruct the inductive power outlet to drive the primary inductive coil at a first operating power; an initial pulse of approximately 8 kilohertz to instruct the inductive power outlet to drive the primary inductive coil at a second operating power; a pulse of approximately one kilohertz to instruct the inductive power outlet to increase operating power by a first increment; a pulse of between approximately 1.5 kilohertz and approximately 5 kilohertz to instruct the inductive power outlet to increase operating power by a second increment; a pulse of approximately 8 kilohertz to instruct the inductive power outlet to decrease operating power by a first increment; a pulse of approximately 500 hertz to instruct the inductive power outlet to continue driving the primary inductive coil at the same power; and a pulse of approximately 250 hertz to instruct the inductive power outlet to cease driving the primary inductive coil.

In another aspect of the disclosure, a method is taught for transferring power inductively comprising: obtaining an inductive power outlet comprising: at least one primary inductor, at least one driver and at least one instruction signal detector; obtaining an inductive power receiver comprising: at least one secondary inductor and at least one instruction signal generator; driving the primary inductor for a limited time duration; monitoring the signal detector; if at least one instruction signal is detected by the instruction signal detector during the time duration, then repeating steps of driving the primary inductor and monitoring the signal detector; and if no instruction signal is received during the time duration, then terminating the driver. Optionally, the time duration is between five milliseconds and ten milliseconds.

Variously, the method may further comprise at least one of: if the instruction signal detector detects a termination signal, then terminating the driver; if the instruction signal detector detects a perpetuation signal, then continuing to drive the primary inductor with the same power; if the instruction signal detector detects a first increase power signal, then increasing power by a first incremental value; if the instruction signal detector detects a second increase power signal, then increasing power by a second incremental value; and if the if the instruction signal detector detects a decrease power signal, then decreasing power by an incremental value.

Where appropriate, the instruction signal generator comprises a signal transmission circuit operable to draw additional power from the secondary inductive coil thereby generating detectable peaks in primary voltage or primary current. Optionally, the instruction signal detector comprises at least one peak detector configured to detect peaks in primary voltage or primary current; and at least one processor operable to determine the characteristic frequency of the peaks;

Additionally or alternatively, the method may further comprise at least one of: if the peak detector initially detects peaks in primary voltage or primary current having a first characteristic frequency then the driver operating at a first operating power; if the peak detector initially detects peaks in primary voltage or primary current having a second characteristic frequency then the driver operating at a second operating power; if the peak detector detects peaks in primary voltage or primary current having a third characteristic frequency then the driver increasing operating power by a first increment; if the peak detector detects peaks in primary voltage or primary current having a fourth characteristic frequency then the driver increasing operating power by a second increment; if the peak detector detects peaks in primary voltage or primary current having a fifth characteristic frequency then the driver decreasing operating power by a first increment; if the peak detector detects peaks in primary voltage or primary current having a sixth characteristic frequency then the driver decreasing operating power by a second increment; if the peak detector detects peaks in primary voltage or primary current having a seventh characteristic frequency then the driver continuing to operate at same power; and if the peak detector detects peaks in primary voltage or primary current having an eighth characteristic frequency then the driver ceasing to provide the oscillating voltage.

Variously, the characteristic frequency may be selected from at least one of a group consisting of: 250 hertz, 500 hertz, 1 kilohertz, from 1.5 kilohertz to 5 kilohertz, 8 kilohertz or the like.

Other embodiments of the present invention are directed towards providing an inductive power transfer system comprising at least one inductive power outlet comprising at least one primary inductive coil wired to a power supply via a driver; the primary inductive coil for forming an inductive couple with at least one secondary inductive coil wired to an electric load, the secondary inductive coil associated with an inductive power receiver wherein the driver is configured to provide a driving voltage across the primary inductive coil, the driving voltage oscillating at a transmission frequency significantly different from the resonant frequency of the inductive couple. Optionally, the driver comprises a switching unit for intermittently connecting the primary inductive coil to the power supply.

Optionally, the transmission frequency lies within a range in which induced voltage varies approximately linearly with frequency. Optionally, the driver is configured to adjust the transmission frequency in response to the feedback signals.

Optionally, the inductive power outlet comprising a signal detector adapted to detect a first signal and a second signal, and the driver is configured to: increase the transmission frequency when the first signal is detected by the detector, and decrease the transmission frequency when the second signal is detected by the detector. The feedback signals generally carry data pertaining to the operational parameters of the electric load. Operational parameters are selected from the group comprising: required operating voltage for the electric load; required operating current for the electric load; required operating temperature for the electric load; required operating power for the electric load; measured operating voltage for the electric load; measured operating current for the electric load; measured operating temperature for the electric load; measured operating power for the electric load; power delivered to the primary inductive coil; power received by the secondary inductive coil, and a user identification code. Optionally, the detector is selected from the list comprising optical detectors, radio receivers, audio detectors and voltage peak detectors.

Optionally, the driver further comprises a voltage monitor for monitoring the amplitude of a primary voltage across the primary coil. Optionally, the voltage monitor is configured to detect significant increases in primary voltage.

In other embodiments, the driving voltage oscillating at a transmission frequency higher than the resonant frequency of the inductive couple, wherein the primary inductive coil is further wired to a reception circuit comprising a voltage monitor for monitoring the amplitude of a primary voltage across the primary coil, and the secondary inductive coil is further wired to a transmission circuit for connecting at least one electric element to the secondary inductive coil thereby increasing the resonant frequency, or adjusting the quality factor such that a control signal may be transferred from the transmission circuit to the reception circuit. Optionally, the secondary inductive coil is wired to two inputs of a bridge rectifier and the electric load is wired to two outputs of the bridge rectifier wherein the transmission circuit is wired to one input of the bridge rectifier and one output of the bridge rectifier. Typically, the transmission circuit further comprises a modulator for modulating a bit-rate signal with an input signal to create a modulated signal and a switch for intermittently connecting the electrical element to the secondary inductive coil according to the modulated signal. Optionally, the voltage monitor further comprises a correlator for cross-correlating the amplitude of the primary voltage with the bit-rate signal for producing an output signal.

In certain embodiments, the control signal is for transferring a feedback signal from the secondary inductive coil to the primary inductive coil for regulating power transfer across an inductive power coupling. The driver may be configured to adjust the transmission frequency in response to the feedback signals. Typically, the system is adapted to transfer a first signal and a second signal, and the driver is configured to: increase the transmission frequency when the first signal is received by the receiver, and decrease the transmission frequency when the second signal is received by the receiver.

Variously, embodiments of the invention may be incorporated into at least one application selected from a group consisting of: inductive chargers, inductive power adaptors, power tools, kitchen appliances, bathroom appliances, computers, media players, office equipment, implanted devices, pace makers, trackers and RFID tagsinductive chargers, inductive power adaptors It is a further aim of the current invention to teach a method for regulating power transmission inductive from a primary inductive coil, wired to a power supply via a driver, to a secondary inductive coil, wired to an electric load, the method comprising the following steps: (a)—providing an oscillating voltage to the primary inductive coil at an initial transmission frequency ft which is substantially different from the resonant frequency $f_R$ of the system; (b)—inducing a secondary voltage in the secondary inductive coil; (c)—monitoring power received by the electric load; (d)—sending a feedback signal when the monitored power deviates from a predetermined range; (e)—the driver receiving the feedback signal; (f)—the driver adjusting the transmission frequency; and (g)—repeating steps (b)-(f).

Optionally, step (d) further comprises: (d1) sending a feedback signal of a first type $S_a$ to the driver, whenever the power drops below a predetermined lower threshold, and (d2) sending a feedback signal of a second type $S_b$ to the driver, whenever the power exceeds a predetermined upper threshold.

According to preferred embodiments the initial transmission frequency $f_t$ is higher than the resonant frequency $f_R$ and step (f) further comprises: (f1) the driver reducing the transmission frequency by an incremental value $-\delta f_1$ when the received feedback signal is of the first type $S_a$, and (f2) the driver increasing the transmission frequency by an incremental value $+\delta f_2$ when the received feedback signal is of the second type $S_b$.

In still other embodiments, the invention is directed to teaching another method for transferring a signal from a secondary inductive coil to a primary inductive coil of an inductive power transfer system, said method comprising the following steps: Step (i)—connecting the primary inductive coil to a voltage monitor for monitoring the amplitude of a primary voltage across the primary coil; Step (ii)—connecting the secondary inductive coil to a transmission circuit for selectively increasing the resonant frequency of the inductive power transfer system; Step (iii)—providing an oscillating voltage to the primary inductive coil at an initial transmission frequency higher than the resonant frequency thereby inducing a voltage in the secondary inductive coil; Step (iv)—using the transmission circuit to modulate a bit-rate signal with the input signal to create a modulated signal and connecting the electrical element to the secondary inductive coil intermittently according to the modulated signal, and Step (v)—using the voltage monitor to cross-correlate the amplitude of the primary voltage with the bit-rate signal for producing an output signal.

It is noted that the term 'resonant frequency' or 'effective resonant frequency' as used herein refers to the frequency of the peak value of a plot of a variable against frequency. It is particularly noted that the resonant frequency effectively increases as a resonant system is damped.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required, user input devices may be provided such as keyboards, cameras, microphones, accelerometers, motion detectors or pointing devices such as mice, roller balls, touch pads, touch sensitive screens or the like.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings:

FIG. 14 is a table representing various messages used during operation of an inductive power transfer system;

FIGS. 16A and 16B illustrate embodiments of possible transmitters for use in an inductive power transfer system;

FIG. 17 is an exploded view of a possible inductive power outlet for use as a transmitter;

FIGS. 18, 19 and 20 are tables representing possible parameters for various elements of embodiments of the inductive power transmitter;

FIG. 21 is a block diagram of selected elements of an inductive power receiver;

FIG. 22 is a table presenting an example of a possible receiver operational frequency range;

FIG. 23 illustrates a possible receiver detection configuration;

FIG. 24 schematically represents a possible testing circuit;

FIG. 25 is a table illustrating possible parameters for a receiver detection mechanism;

FIGS. 26A and 26B illustrate characteristics of signal pulses;

FIG. 27 is a table illustrating characteristic parameters for a variety of signal types;

FIG. 28 illustrates a possible profile for a signal pulse;

FIG. 29 is a table illustrating possible instructions associated to signal pulses;

FIG. 30 is a table illustrating various possible receiver detection parameters;

FIGS. 31-33 schematically represents possible phase transitions for various conditions;

FIG. 34 is a table illustrating possible receiver detection parameters;

FIG. 35 illustrates an example describing the method in which the receiver will regulate the delivered power;

FIGS. 36A and 36B illustrate an example of the operation of the receiver and transmitter for a frequency decrement request;

FIG. 37 is a table illustrating receiver power transfer operation;

FIG. 38 shows a possible profile for a digital ping;

FIG. 39 is a table illustrating various transmitter constraints during a digital ping;

FIG. 40 is a table illustrating transmitter power transfer operation parameters;

FIG. 41 is a table illustrating possible control algorithm parameters;

FIG. 42 illustrates a possible mechanical structure for a receiver coil;

FIG. 43 is a table presenting various mechanical parameter restraints for a receiver coil;

FIG. 44 schematically represents a possible resonant circuit for use in a receiver;

DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
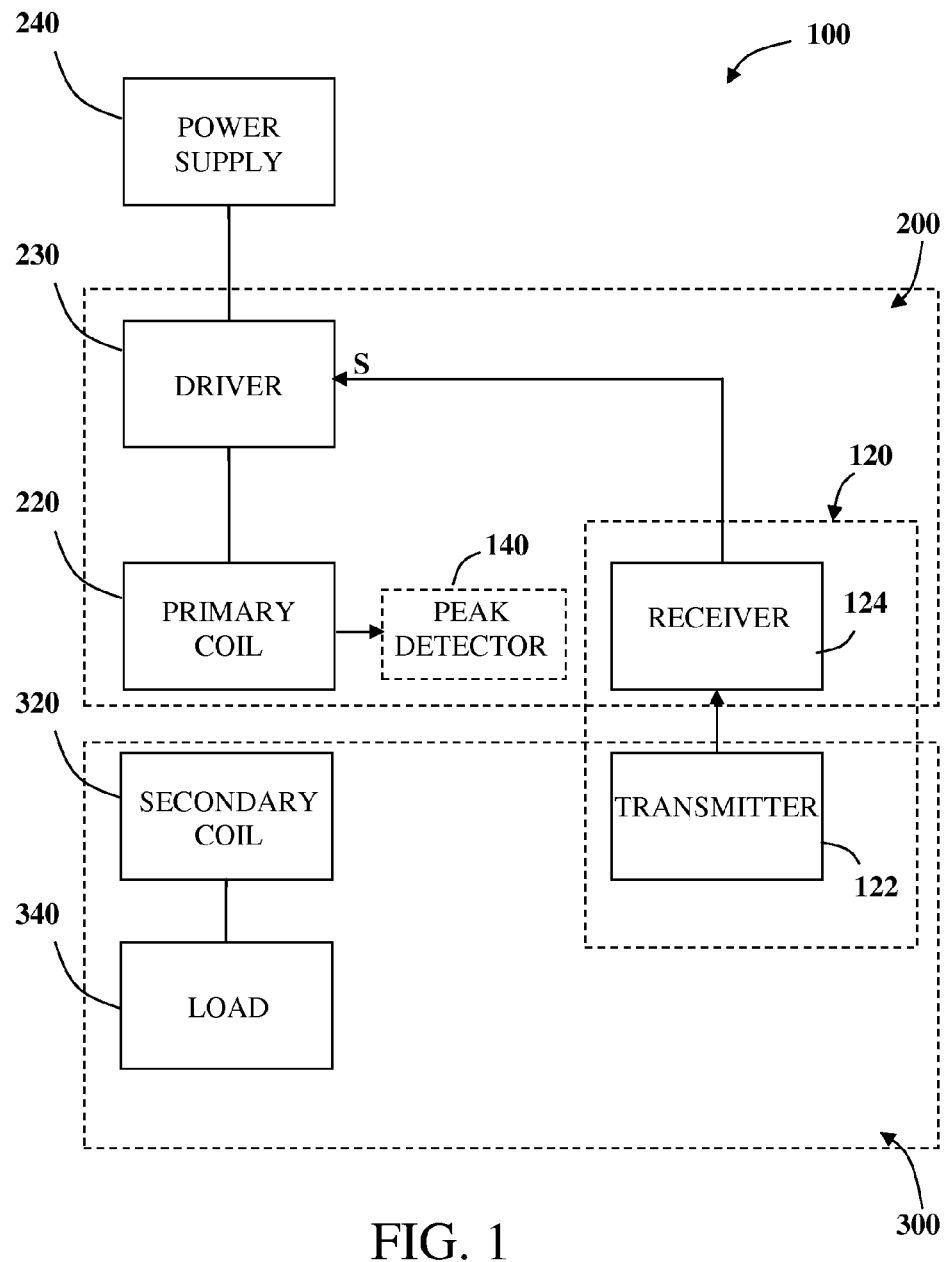
FIG. 1 is a block diagram showing the main elements of an inductive power transfer system with a feedback signal path according to embodiments of the present invention.

Reference is now made to FIG. 1 showing a block diagram of the main elements of an inductive power transfer system 100 adapted to transmit power at a non-resonant frequency according to another embodiment of the invention. The inductive power transfer system 100 consists of an inductive power outlet 200 configured to provide power to a remote secondary unit 300. The inductive power outlet 200 includes a primary inductive coil 220 wired to a power source 240 via a driver 230. The driver 230 is configured to provide an oscillating driving voltage to the primary inductive coil 220.

The secondary unit 300 includes a secondary inductive coil 320, wired to an electric load 340, which is inductively coupled to the primary inductive coil 220. The electric load 340 draws power from the power source 240. A communication channel 120 may be provided between a transmitter 122 associated with the secondary unit 300 and a receiver 124 associated with the inductive power outlet 200. The communication channel 120 may provide feedback signals S and the like to the driver 230.

In some embodiments, a voltage peak detector 140 is provided to detect large increases in the transmission voltage. As will be descried below the peak detector 140 may be used to detect irregularities such as the removal of the secondary unit 200, the introduction of power drains, short circuits or the like.

Figure 2:
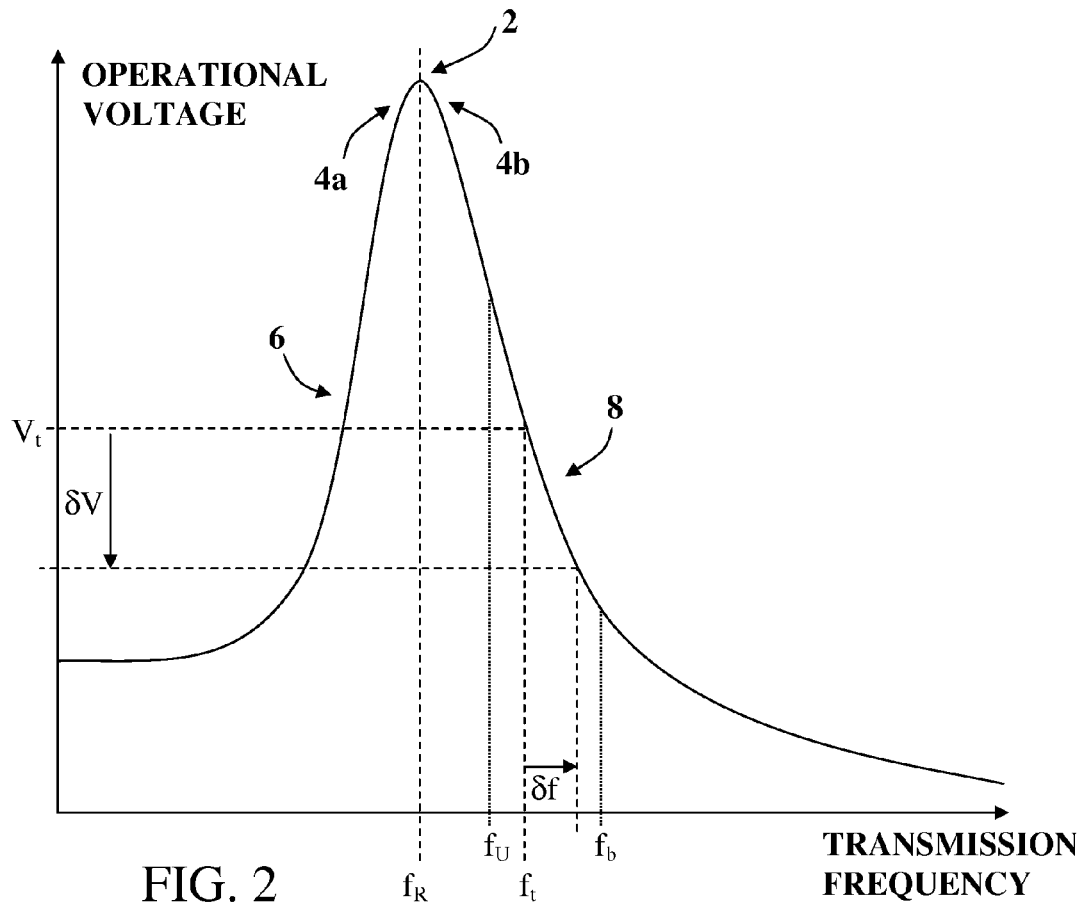
FIG. 2 is a graph showing how the amplitude of operational voltage of an inductive power transfer system varies with transmission frequency.

FIG. 2 is a graph showing how the amplitude of the operational voltage of an inductive power transfer system varies according to the transmission frequency. It is noted that the voltage is at its highest when the transmission frequency is equal to the resonant frequency $f_R$ of the system, this maximum amplitude is known as the resonance peak 2. It is further noted that the slope of the graph is steepest in the regions 4a, 4b to either side of the resonance peak 2. Thus in inductive transfer systems, which operate at or around resonance, a small variation in frequency results in a large change in induced voltage. Similarly, a small change in the resonant frequency of the system results in a large change in the induced voltage. For this reason prior art resonant inductive transfer systems are typically very sensitive to small fluctuations in environmental conditions or variations in alignment between the induction coils.

It is a particular feature of embodiments of the current invention that the driver 230 (FIG. 1) is configured and operable to transmit a driving voltage which oscillates at a transmission frequency which is substantially different from the resonant frequency of the inductive couple. Optionally the transmission frequency is selected to lie within one of the near-linear regions 6, 8 where the slope of the frequency-amplitude graph is less steep.

Figure 3:
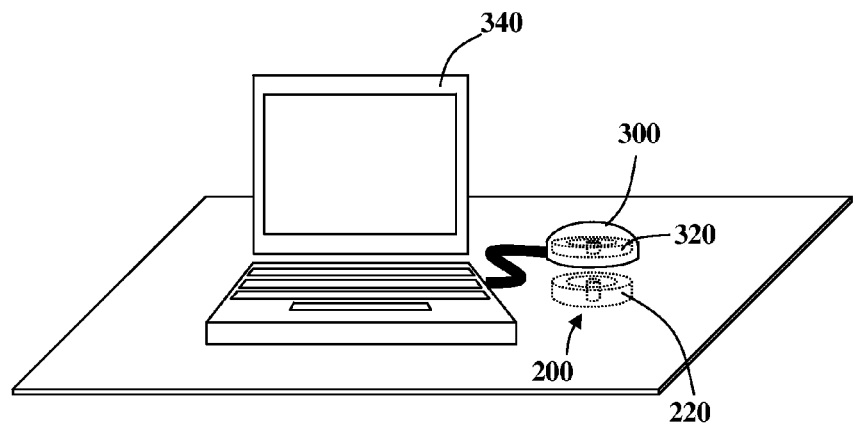
FIG. 3 is a schematic diagram representing a laptop computer drawing power from an inductive power outlet.

One advantage of this embodiment of the present invention may be demonstrated with reference now to FIG. 3. A schematic diagram is shown representing a laptop computer 340 drawing power from an inductive power outlet 200 via a secondary power receiving unit 300. The power receiving unit 300 includes a secondary inductive coil 320 which is aligned to a primary inductive coil 220 in the inductive power outlet 200. Any lateral displacement of the secondary power receiving unit 300 changes the alignment between the secondary inductive coil 320 to the primary inductive coil 220. As a result of the changing alignment, the combined inductance of the coil pair changes which in turn changes the resonant frequency of the system.

If the inductive power outlet 200 transmits power at the resonant frequency of the system, even a small lateral movement would reduce significantly the amplitude of the induced voltage. In contradistinction to the prior art, in embodiments of the present invention the inductive power outlet 200 transmits power at a frequency in one of the regions 6, 8 to either side of the resonance peak 2 (FIG. 2) where the slope of the resonance graph is much shallower. Consequently, the system has a much larger tolerance of variations such as lateral movement.

A further feature of embodiments of inductive power outlets transmitting at frequencies above the natural resonant frequency of the system, is that if the resonant frequency of the system increases for some reasons, then the transmission voltage increases sharply. In preferred embodiments, a peak detector 140 (FIG. 1) is be provided to monitor the transmission voltage of the power outlet 200 and is configured to detect large increases in the transmission voltage indicating an increase in resonant frequency.

Referring again to the resonant formula for inductive systems, $$f_R = \frac{1}{2\pi\sqrt{LC}},$$

it is noted that any decrease in either the inductance L or the capacitance C of the system increases the resonant frequency and may be detected by the peak detector 140.

As an example of the use of a peak detector 140, reference is again made to FIG. 3. It will be appreciated that in a desktop environment, conductive bodies such as a paper clip, metal rule, the metal casing a stapler, a hole-punch or any metallic objects may be introduced between the inductive power outlet 200 and the secondary power receiving unit 300. The oscillating magnetic field produced by the primary coil 220 would then produce eddy currents in the conductive body heating it and thereby draining power from the primary coil 220. Such a power drain may be wasteful and/or dangerous. Power drains such as described above generally reduce the inductance L of the system thereby increasing its resonant frequency.

The inductance L of the system may also be reduced by the removal of the secondary coil 220, the creation of a short circuit or the like. A peak detector 140, wired to the inductive power outlet, may detect any of these scenarios as a large increase in transmission voltage. Where required, the power transfer system may be further configured to shut down, issue a warning or otherwise protect the user and the system in the event that the peak detector 140 detects such an increase in transmission voltage.

Figure 4:
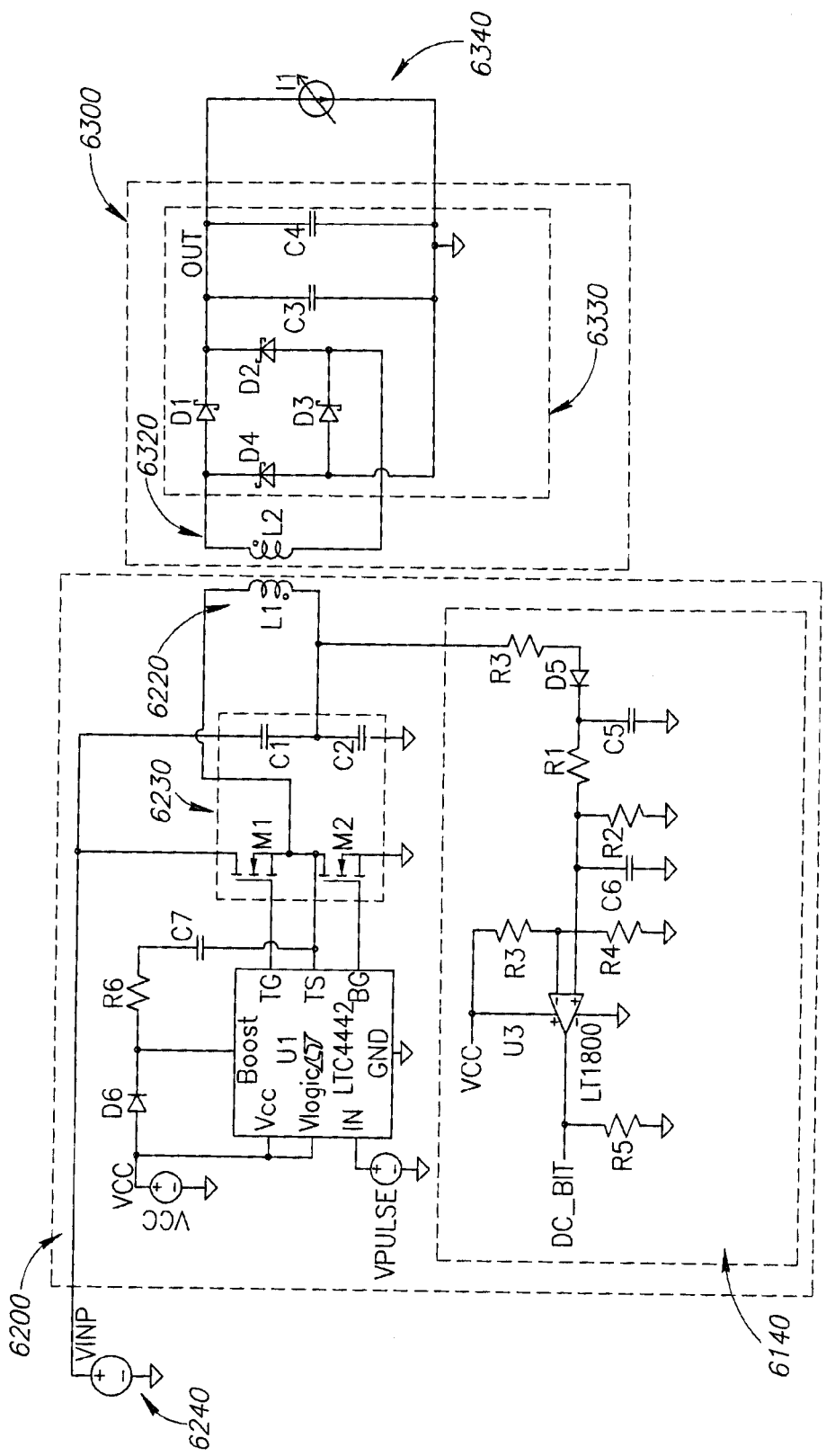
FIG. 4 is a circuit diagram of an inductive power transfer system according to another embodiment of the invention including a peak detector for detecting large increases in transmission voltage.

FIG. 4 is a circuit diagram of an inductive power outlet 6200 and secondary unit 6300. The secondary unit 6300 comprises a secondary coil 6320 wired to an electric load 6340 via a rectifier 6330.

The inductive power outlet 6200 comprises a primary coil 6220 driven by a half-bridge converter 6230 connected to a power source 6240. The half-bridge converter 6230 is configured to drive the primary coil 6220 at a frequency higher than the resonant frequency of the system and a peak detector 6140 is configured to detect increases in the transmission voltage.

Although only a half-bridge converter is represented in FIG. 4, it is noted that other possible driving circuits include: a DC-to-DC converter, an AC-to-DC converter, an AC-to-AC converter, a flyback transformer, a full-bridge converter, a flyback converter or a forward converter for example.

Another advantage of non-resonant transmission is that the transmission frequency may be used to regulate power transfer. Prior art inductive power transfer systems, typically regulate power transfer by altering the duty cycle of the transmission voltage. Unlike prior art systems, because embodiments of the present invention transmit at a frequency not equal to the resonant frequency of the system, the driver 230 may be configured to regulate power transfer by adjusting the transmission frequency.

The regulation is illustrated with reference to FIG. 2. In embodiments of the invention, the frequency of transmission may be selected to be in the approximately linear region 8 of the curve between a lower frequency value of $f_L$, and an upper frequency value of $f_U$. A transmission frequency $f_t$, higher than the resonant frequency $f_R$ of the system, produces an induced voltage of $V_t$. The induced voltage can be increased by reducing the transmission frequency so that it is closer to the resonant frequency $f_R$. Conversely, the induced voltage may be reduced by increasing the transmission frequency so that it is further from the resonant frequency $f_R$. For example, an adjustment of transmission frequency by $\delta f$ produces a change in induced voltage of $\delta V$.

In some embodiments, a communication channel 120 (FIG. 1) is provided between the secondary unit 300 and the inductive power outlet 200 to communicate the required operating parameters. In embodiments of the invention operating parameters the communication channel 120 may be used to indicate the transmission frequency required by the electric load 340 to the driver 230.

The communication channel 120 may further provide a feedback signal during power transmission. The feedback transmission may communicate required or monitored operating parameters of the electric load 240 such as: required operating voltage, current, temperature or power for the electric load 240, the measured voltage, current, temperature or power supplied to the electric load 240 during operation, the measured voltage, current, temperature or power received by the electric load 240 during operation and the like.

In some embodiments, a microcontroller in the driver 230 may use such feedback parameters to calculate the required transmission frequency and to adjust the driver accordingly. Alternatively, simple feedback signals may be provided indicating whether more or less power is required.

Figure 5:
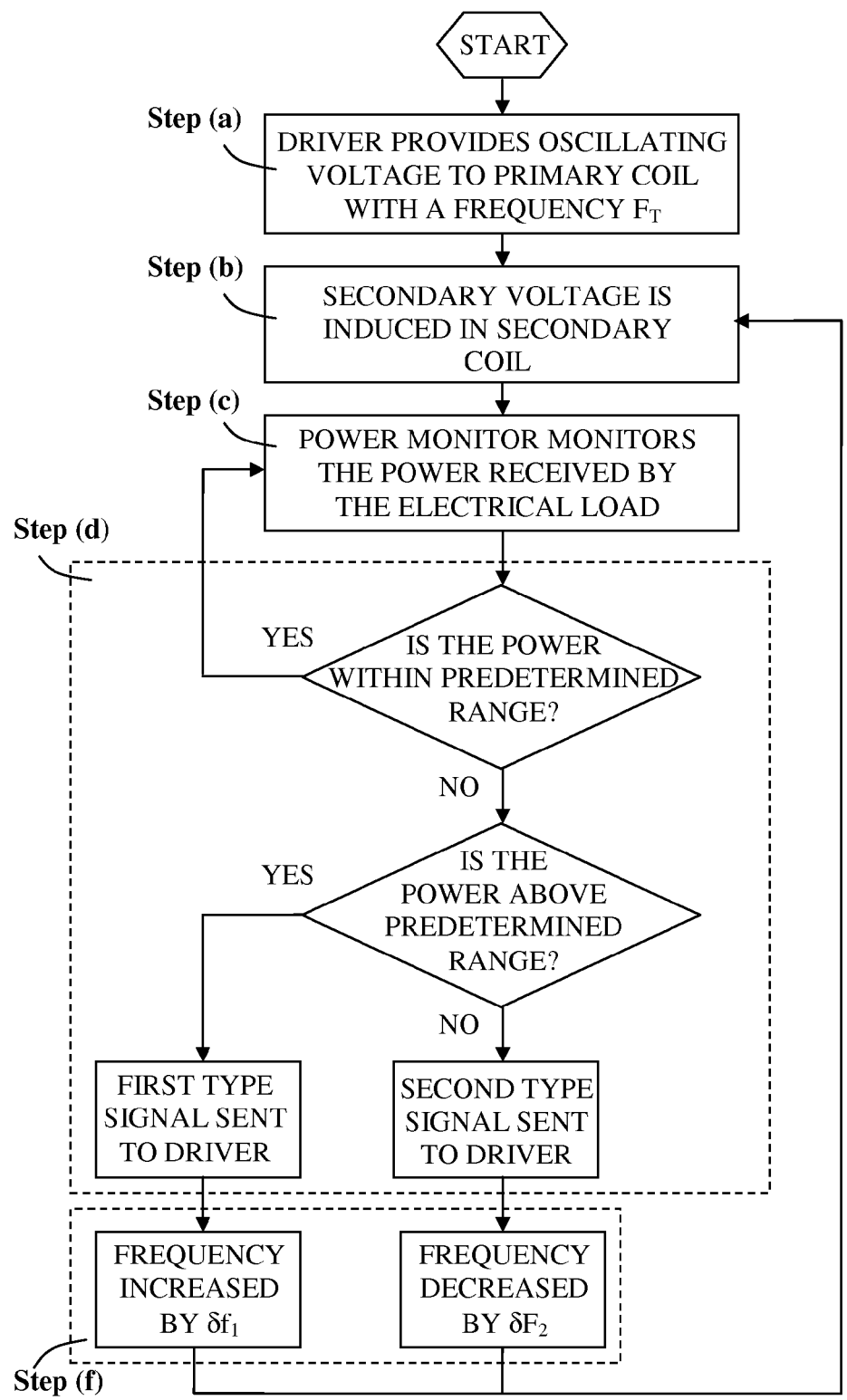
FIG. 5 is a flowchart showing a method for regulating power transfer by varying the power transmission frequency in an inductive power transfer system according to a further embodiment of the invention.

One example of a power regulation method using simple feedback signals is shown in the flowchart of FIG. 5. The method involves the following steps:

Step (a)—The driver 230 provides an oscillating voltage at a transmission frequency $f_t$ which is higher than the resonant frequency $f_R$ of the system.

Step (b)—A secondary voltage is induced in the secondary coil 320.

Step (c)—A power monitor in the secondary unit 300, monitors the power received by the electric load 340.

Step (d)—If the power received by the electric load 340 lies within a predetermined range then no action is taken. If the power received by the electric load 340 is below the predetermined range, then a feedback signal of a first type $S_a$ is sent to the driver. If the power received by the electric load 340 is above the predetermined range, then a feedback signal of a second type $S_b$ is sent to the driver.

Step (e)—A feedback signal is received by the driver 230.

Step (f)—If the received feedback signal is of the first type $S_a$, then the transmission frequency is increased by an incremental value $+\delta f_1$. If the received feedback signal is of the second type $S_b$, then the transmission frequency is decreased by an incremental value $-\delta f_2$.

It is noted that by using the power regulation method described above, when the power received by the load is too high, a series of feedback signals of the first type $S_a$ will be transmitted until the power is reduced into the acceptable range. Likewise when the power received by the load is too low, a series of feedback signals of the second type $S_b$ will be transmitted until the power is increased into the acceptable range. It is noted that the positive incremental value $\delta f_1$ may be greater than, less than or equal to the negative incremental value $\delta f_2$.

Alternatively, other power regulation methods using frequency adjustment may be used. For example, the operating parameters of the electric load may be monitored and their values may be transmitted to the power outlet via the communications channel 120. A processor in the power outlet may then calculate the required transmission frequency directly.

The method described hereabove, refers to a non-resonant transmission frequency lying within the linear region 8 (FIG. 2), higher than the resonant peak 2. It will be appreciated however that in alternative embodiments frequency-controlled power regulation may be achieved when the transmission frequency lies in the lower linear region of the resonance curve. Nevertheless, for certain embodiments, the selection of transmission frequencies in the higher linear 8 may be preferred, particularly where peak detection, as described above, is required.

Referring back to FIG. 1, various transmitters 122 and receivers 124 may be used for the communication channel 120. Where, as is often the case for inductive systems, the primary and secondary coils 220, 320 are galvanically isolated optocouplers, for example, may be used. A light emitting diode serves as a transmitter and sends encoded optical signals over short distances to a photo-transistor which serves as a receiver. However, optocouplers typically need to be aligned such that there is a line-of-sight between transmitter and receiver. In systems where alignment between the transmitter and receiver may be difficult to achieve, optocoupling may be inappropriate and alternative systems may be preferred such as ultrasonic signals transmitted by piezoelectric elements or radio signals such as Bluetooth, WiFi and the like. Alternatively the primary and secondary coils 220, 320 may themselves serve as the transmitter 122 and receiver 124.

In certain embodiments, an optical transmitter, such as a light emitting diode (LED) for example, is incorporated within the secondary unit 300 and is configured and operable to transmit electromagnetic radiation of a type and intensity capable of penetrating the casings of both the secondary unit 300, and the power outlet 200. An optical receiver, such as a photodiode, a phototransistor, a light dependent resistors of the like, is incorporated within the power outlet 200 for receiving the electromagnetic radiation.

Figure 6:
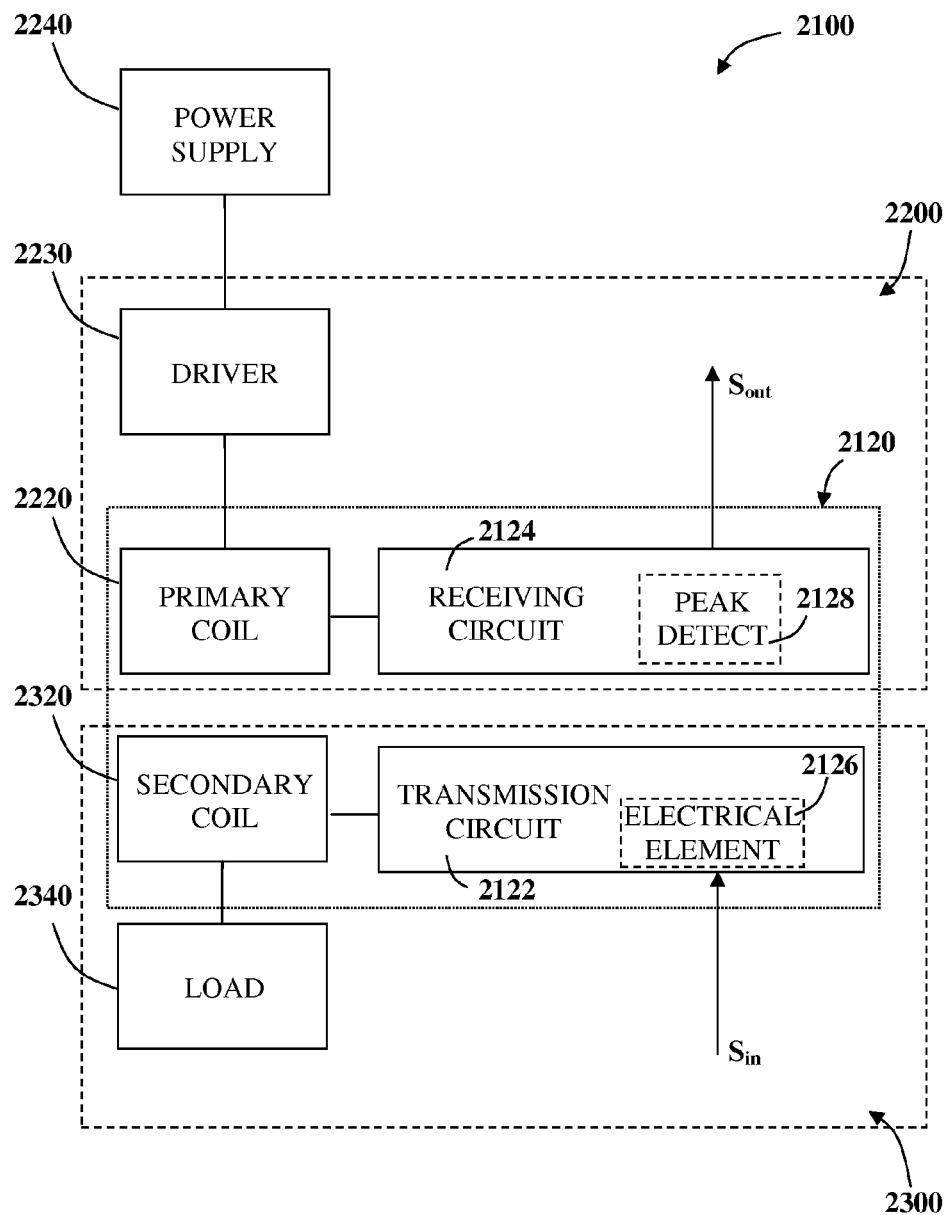
FIG. 6 is a block diagram showing the main elements of an inductive power transfer system with an inductive feedback channel according to still another embodiment of the present invention.

Reference to the block diagram of FIG. 6, it is a particular feature of certain embodiments of the invention that an inductive communications channel 2120 is incorporated into the inductive power transfer system 2100 for transferring signals between a inductive power outlet 2200 and a remote secondary unit 2300. The communication channel 2120 is configured to produce an output signal $S_{out}$ in the power outlet 2200 when an input signal $S_{in}$ is provided by the secondary unit 2300 without interrupting the inductive power transfer from the outlet 2200 to the secondary unit 2300.

The inductive power outlet 2200 includes a primary inductive coil 2220 wired to a power source 2240 via a driver 2230. The driver 2230 is configured to provide an oscillating driving voltage to the primary inductive coil 2220, typically at a voltage transmission frequency $f_t$ which is higher than the resonant frequency $f_R$ of the system.

The secondary unit 2300 includes a secondary inductive coil 2320, wired to an electric load 2340, which is inductively coupled to the primary inductive coil 2220. The electric load 2340 draws power from the power source 2240. Where the electric load 2340 requires a direct current supply, for example a charging device for an electrochemical cell or the like, a rectifier 2330 may be provided to rectify the alternating current signal induced in the secondary coil 2320.

An inductive communication channel 2120 is provided for transferring signals from the secondary inductive coil 2320 to the primary inductive coil 2220 concurrently with uninterrupted inductive power transfer from the primary inductive coil 2220 to the secondary inductive coil 2320. The communication channel 2120 may provide feedback signals to the driver 2230.

The inductive communication channel 2120 includes a transmission circuit 2122 and a receiving circuit 2124. The transmission circuit 2122 is wired to the secondary coil 2320, optionally via a rectifier 2330, and the receiving circuit 2124 is wired to the primary coil 2220.

The signal transmission circuit 2122 includes at least one electrical element 2126, selected such that when it is connected to the secondary coil 2320, the resonant frequency $f_R$ of the system increases. The transmission circuit 2122 is configured to selectively connect the electrical element 2126 to the secondary coil 2320. As noted above, any decrease in either the inductance L or the capacitance C increases the resonant frequency of the system. Optionally, the electrical element 2126 may be have a low resistance for example, with a resistance say under 50 ohms and Optionally about 1 ohm.

It is particularly noted that the electrical element 2126, such as a resistor for example, may act to change the effective resonant frequency of the system by damping or undamping the system and thereby adjusting the quality factor of thereof.

Typically, the signal receiving circuit 2124 includes a voltage peak detector 2128 configured to detect large increases in the transmission voltage. In systems where the voltage transmission frequency $f_t$ is higher than the resonant frequency $f_R$ of the system, such large increases in transmission voltage may be caused by an increase in the resonant frequency $f_R$ thereby indicating that the electrical element 2126 has been connected to the secondary coil 2320. Thus the transmission circuit 2122 may be used to send a signal pulse to the receiving circuit 2124 and a coded signal may be constructed from such pulses.

According to some embodiments, the transmission circuit 2122 may also include a modulator (not shown) for modulating a bit-rate signal with the input signal $S_{in}$. The electrical element 2126 may then be connected to the secondary inductive coil 2320 according to the modulated signal. The receiving circuit 2124 may include a demodulator (not shown) for demodulating the modulated signal. For example the voltage peak detector 2128 may be connected to a correlator for cross-correlating the amplitude of the primary voltage with the bit-rate signal thereby producing the output signal $S_{out}$.

In other embodiments, a plurality of electrical elements 2126 may be provided which may be selectively connected to induce a plurality of voltage peaks of varying sizes in the amplitude of the primary voltage. The size of the voltage peak detected by the peak detector 2128 may be used to transfer multiple signals.

Figure 7:
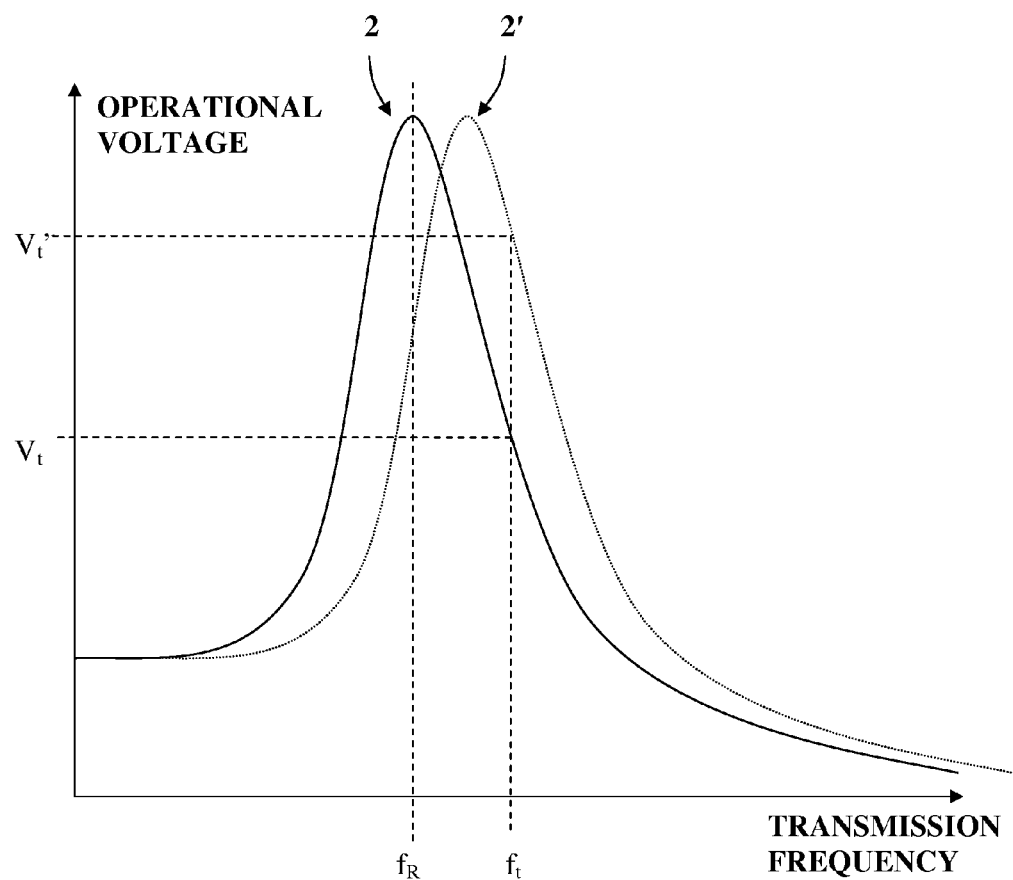
FIG. 7 is a graph showing how the variation of operational voltage with transmission frequency is affected by changes in resonant frequency of the system.

FIG. 7 is a graph showing how the amplitude of the operational voltage varies according to the transmission frequency. It is noted that the voltage is at its highest when the transmission frequency is equal to the resonant frequency $f_R$ of the system, this maximum amplitude is known as the resonance peak 2. If the resonant frequency $f_R$ of the system increases, a new resonance peak 2' is produced.

According to another embodiment of the invention, an inductive power transfer system 2100 operates at a given transmission frequency $f_t$ which is higher than the resonant frequency $f_R$ of the system. The normal operating voltage $V_t$ is monitored by the voltage peak detector 2128. When the electric element 2126 is connected to the secondary inductive coil 2320 the resonant frequency of the system increases. Therefore, the operating voltage increases to a higher value $V_t'$. This increase is detected by the voltage peak detector 2128.

It is noted that in contradistinction to prior art inductive signal transfer systems such as described in U.S. Pat. No. 5,455,466 to Terry J. Parks and David S. Register, the present invention enables data signals to be transferred from the secondary coil 2320 to the primary coil 2220 concurrently with inductive transfer of power from the primary coil 2220 to the secondary coil 2320. Consequently, the signal transfer system may be used to provide feedback signals for real time power regulation.

Figure 8:
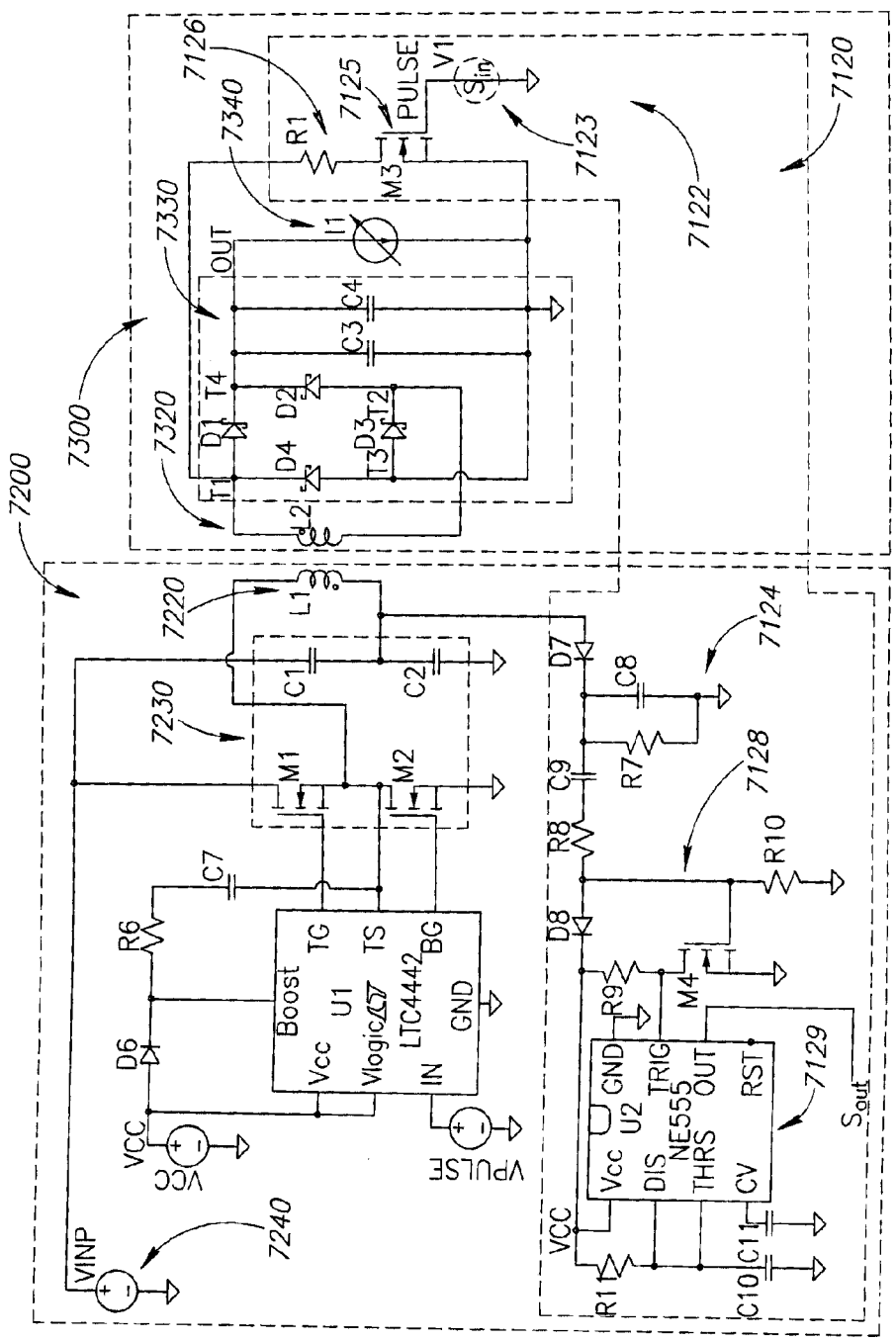
FIG. 8 is a circuit diagram of an inductive power transfer system including an inductive feedback channel for providing coil-to-coil signal transfer concurrently with uninterrupted inductive power transfer between the coils in accordance with yet another embodiment of the invention.

FIG. 8 shows an exemplary circuit diagram of an inductive power outlet 7200 and a secondary unit 7300, according to another embodiment of the invention. An inductive feedback channel 7120 is provided for transferring signals between the coils concurrently with uninterrupted inductive power transfer.

The inductive power outlet 7200 comprises a primary coil 7220 driven by a half-bridge converter 7230 connected to a power source 7240. The half-bridge converter 7230 is configured to drive the primary coil 7220 at a frequency higher than the resonant frequency of the system. The secondary unit 7300 comprises a secondary coil 7320 wired to the input terminals $T_1$, $T_2$ of a rectifier 7330, and an electric load 7340 wired to the output terminals $T_3$, $T_4$ of the rectifier 7330.

The inductive feedback channel 7120 comprises a transmission circuit 7122, in the secondary unit 7300 and a receiving circuit 7124 in the inductive power outlet 7200. The transmission circuit 7122 comprises an electrical resistor 7126 connected to the rectifier 7330 via a power MOSFET switch 7125. A modulator 7123 may provide an input signal $S_{in}$, to the power MOSFET 7125.

It is noted that in this embodiment the transmission circuit 7122 is wired to one input terminal $T_1$ and one output terminal $T_3$ of the rectifier 7330. This configuration is particularly advantageous as, even when the transmission circuit 7122 is connected, the resistor 7126 only draws power from the system during one half of the AC cycle, thereby significantly reducing power loss.

The receiving circuit 7124 includes a voltage peak detector 7128 that is configured to detect increases in the transmission voltage, and a demodulator 7129 for producing an output signal $S_{out}$.

Figure 9:
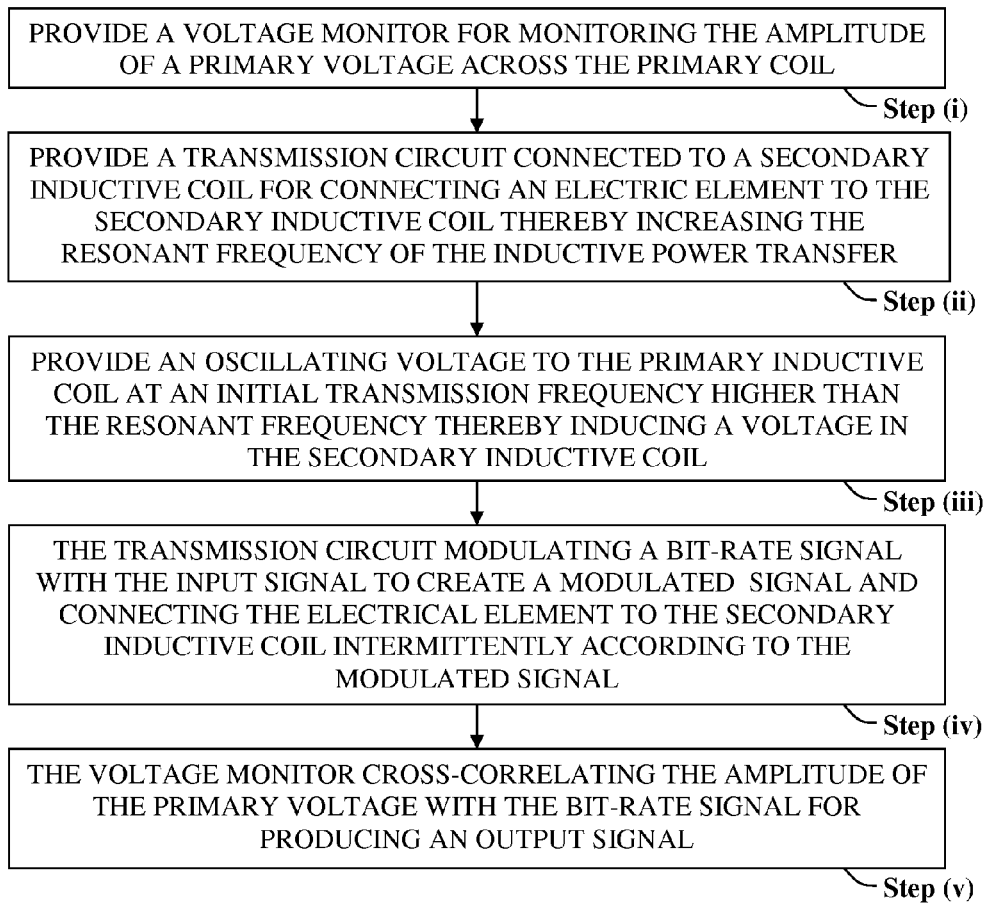
FIG. 9 is a flowchart showing a method for inductively transferring a signal from the secondary inductive coil to a primary inductive coil of an inductive power transfer system according to still a further embodiment of the invention.

With reference now to FIG. 9, a flowchart is presented showing the main steps in a method for transferring a signal from the secondary inductive coil to a primary inductive coil of an inductive power transfer system. The method includes the following steps:

Step (i)—connecting the primary inductive coil to a voltage monitor for monitoring the amplitude of a primary voltage across the primary coil;

Step (ii)—connecting the secondary inductive coil to a transmission circuit for selectively increasing the resonant frequency of the inductive power transfer system;

Step (iii)—providing an oscillating voltage to the primary inductive coil at an initial transmission frequency higher than the resonant frequency thereby inducing a voltage in the secondary inductive coil;

Step (iv)—using the transmission circuit to modulate a bit-rate signal with the input signal to create a modulated signal and connecting the electrical element to the secondary inductive coil intermittently according to the modulated signal, and Step (v)—using the voltage monitor to cross-correlate the amplitude of the primary voltage with the bit-rate signal for producing an output signal.

Therefore, the inductive communication channel 2120 may be used to transfer a feedback signal from the secondary inductive coil to the primary inductive coil for regulating power transfer across an inductive power coupling as described above.

It will be appreciated that embodiments of the present invention may be useful in a wide range of applications. Inductive power receivers may be used to wirelessly provide power for a variety of electrical devices. Embodiments of the present invention may be integrated into such inductive power receivers. In particular, because non-resonant transmission uses lower transmission voltages, heat loss from the non-resonant system is lower. Thus embodiments of the current invention may be of particular use when incorporated within high power applications such as power tools, kitchen appliances, bathroom appliances, computers, media players, office equipment and the like.

The reduced heat loss, associated with embodiments of the non-resonant systems of the invention, is particularly useful when heat dissipation is difficult for example when power receiver has small dimensions or for heat-sensitive equipment such as measuring devices. Also, it is desirable that devices implanted into a living body do not dissipate large amounts of heat into the body. Therefore, non-resonant inductive transfer is well suited to implanted devices, such as pace makers, trackers and the like.

It is also noted that in recent years public concern about the threat of a global energy crisis has resulted in a greater emphasis being placed upon optimizing the efficiency of energy transfer. It is difficult to achieve more demanding specifications using existing technology and, in this context, embodiments of the present invention may be used to provide high powers with very low energy losses. Consequently the current invention is an important element in the drive for greater efficiency.

Furthermore embodiments of the present invention may be advantageously utilized in inductive power transfer systems in any of the various applications in which power is transferred from a primary coil to a remote secondary coil. Amongst others, such applications include: inductive chargers for use charging electronic devices, inductive power adaptors for powering electronic devices such as computers, televisions, kitchen appliances, office equipment and the like, medical applications in which power is transferred remotely to devices implanted in a patient, communications with remote RFID tags, military application in which power is transferred across thick armored plating, communication or inductive energy transfer to secondary inductive coils buried underground, communication or inductive energy transfer to secondary inductive coils submerged under water, for example in submarine applications, and communication or inductive energy with secondary coils which are moving relative to the primary coil.

Thus, by using a transmission voltage oscillating at a frequency different from the resonant frequency of the system, the inductive transfer system has a higher tolerance to environmental fluctuations and variations in inductive coil alignment than other transfer systems and the frequency may be used to regulate power transfer. Moreover, when the transmission frequency is higher than the resonant frequency of the system, a peak detector may be used to indicate hazards and provide an inductive communication channel.

Energy Efficient Inductive System

Figure 10A:
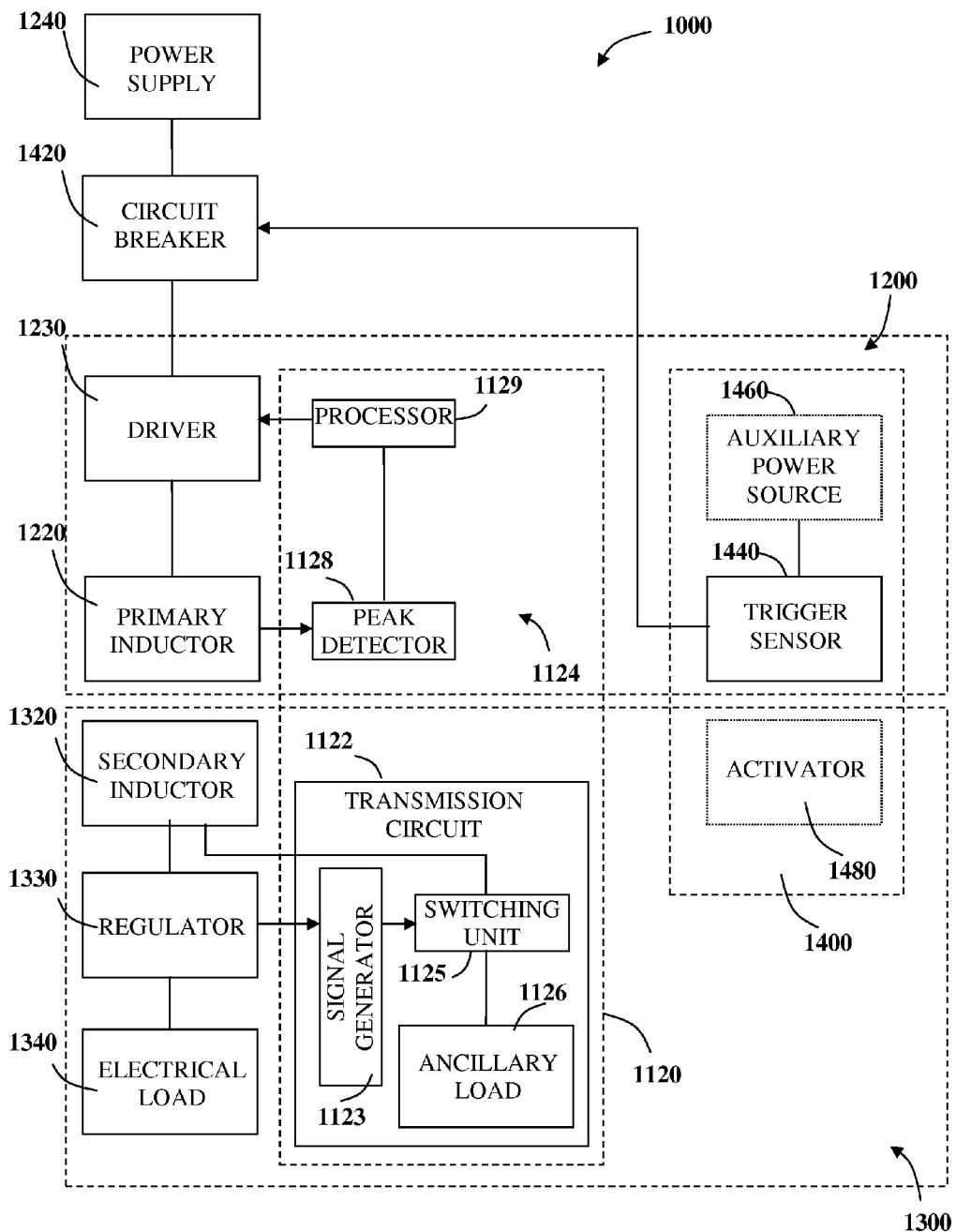
FIG. 10A is a block diagram representing selected components of an energy efficient inductive power transfer system incorporating activation and termination mechanisms.

Reference is now made to the block diagram of FIG. 10A representing selected components of an embodiment of an energy efficient inductive power transfer system 1000. The inductive power transfer system 1000 includes an inductive power outlet 1200 and an inductive power receiver 1300 and is configured to switch between transmission mode and standby mode.

In standby mode, the system 1000 may be dormant with the inductive power outlet 1200 and inductive power receiver 1300 waiting for an activation signal before transitioning to transmission mode. In transmission mode, the inductive power system 1000 is configured and operable to draw power from a power supply 1240, such as a mains electricity supply, a vehicle battery, a power generator, fuel cell or the like, to an electric load 1340.

It will be appreciated, that such an inductive power transfer system 1000 may significantly reduce power losses associated with prior art power transfer systems. During the standby mode little or no power may be drawn from the power supply 1240. The inductive power outlet 1200 may be configured to switch to transmission mode only in the presence of a suitable inductive power receiver 1300. Furthermore, the system 1000 may be operable to revert to standby mode when no power need be transferred, for example when the inductive power receiver 1300 is removed or the electric load 1340 requires no further power. Thus power is only drawn by the system 1000 when actually required. Various activation and termination protocols may be used with the system, such as described hereinbelow.

Figure 10B:
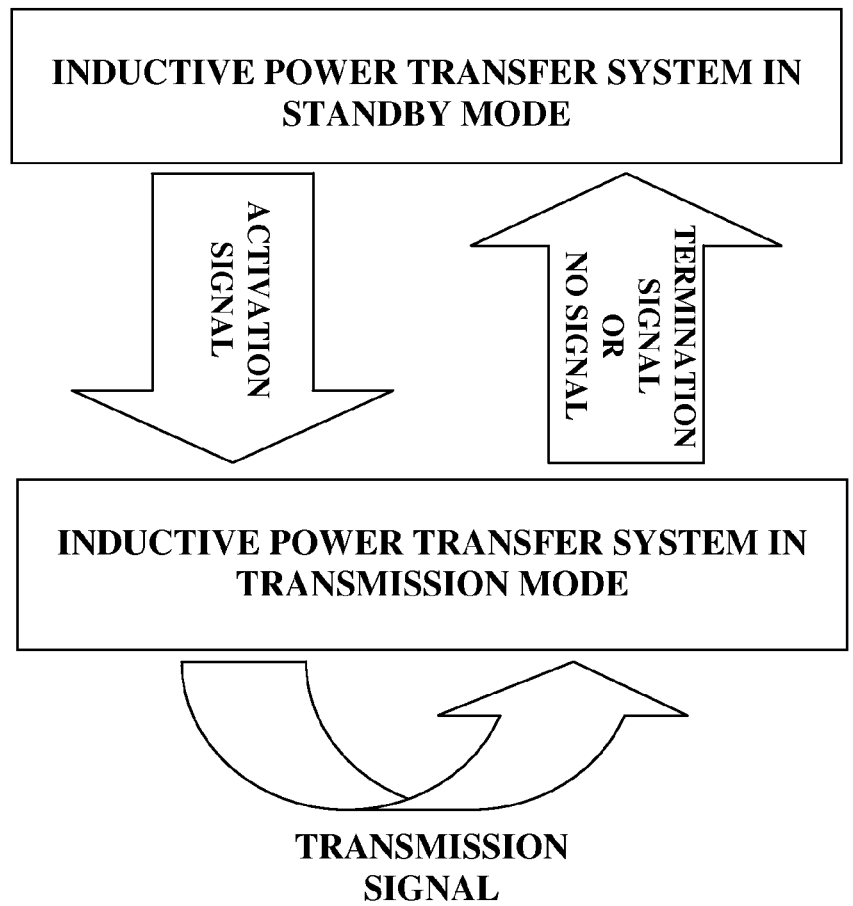
FIG. 10B is a flowchart representing transition between standby mode and transmission mode for activating and terminating an energy efficient inductive power transfer system.

Referring now to the flowchart of FIG. 10B, the inductive power transfer system 1000 may switch between standby mode and transmission mode by a number of pathways. When in standby mode, the inductive power outlet 1200 or the inductive power receiver 1300 may be configured to wait for an activation signal. If such an activation signal is received, the system 1000 may switch to transmission mode. Where appropriate, activation of the system 1000 may involve an initial trigger signal activating the inductive power outlet 1200 and an authentication process confirming the presence of a suitable inductive power receiver 1300.

When in transmission mode, the inductive power transfer system 1000 may be configured to periodically transfer signals between the inductive power receiver 1300 and the inductive power outlet 1200, such as described hereinabove in relation to FIG. 5, for example.

As detailed below, various transmission signals may be used with the system, for example, instructions may be sent from the inductive power receiver 1300 to the inductive power outlet 1200 to increase power by a certain interval, to decrease power by a certain interval, to maintain the same power, to terminate power transfer or the like. Where no such transmission signals are received, the inductive power outlet 1200 may be configured to stop driving the primary inductor 1220 and to revert to the standby mode.

In particular, the inductive power transfer system 1000 may be configured to revert to standby mode when a termination signal is transferred between the inductive power receiver 1300 and the inductive power outlet 1200. Where appropriate, the inductive power receiver 1300 may be configured to send a termination signal to the inductive power outlet 1200 when the electric load 1340 no longer requires power. For example, where the electric load 1340 is an electrochemical cell being charged by an inductive charger, say, a termination signal may be generated when the electrical cell is fully charged.

It will be appreciated that an inductive power transfer system such as disclosed herein may reduce significantly the amount of power drawn by dormant power adaptors, chargers and the like.

Referring back to FIG. 10A, the system 1000 may include a trigger mechanism 1400 and a signal transfer mechanism 1120. The trigger mechanism 1400 may be used while the inductive power transfer system 1000 is in the standby mode, to provide an initial trigger to generate an activation signal such that the inductive power transfer system 1000 switches to transmission mode. The signal transfer mechanism 1120 may provide a channel for the inductive power receiver 1300 to send instruction signals, such as identification signals, authentication signals, transmission signals, termination signals or the like to the inductive power outlet 1200. Furthermore, the signal transfer mechanism 1120 may provide a channel for data transfer signals for communication of information from the inductive power receiver 1300 to the inductive power outlet 1200.

The inductive power outlet 1200 of the inductive power transfer system 1000 includes a primary inductor 1220 such as a primary inductive coil, for example, connectable to the power supply 1240 via a driver 1230. The driver 1230 provides the electronics necessary for supplying an oscillating voltage to the inductive coil 1220. The inductive power receiver 1300 typically includes a secondary inductor 1320, such as a secondary inductive coil, a regulator 1330 and an electrical load 1340.

The secondary inductive coil 1320 is configured to inductively couple with the primary inductive coil 1220 of the inductive power outlet 1200. Where required, the regulator 1330 may include a rectifier to convert alternating current induced across the secondary coil 1320 to a direct current signal for supplying the electrical load 1340. A rectifier 1330 may be necessary, for example, where the electrical load 1340 comprises an electrochemical cell to be charged.

The trigger mechanism 1400 may control the connection between the power supply 1240 and the inductive power outlet 1200. The trigger mechanism 1400 may include a circuit breaker 1420 and a trigger sensor 1440. Optionally, trigger mechanism 1400 may further include an auxiliary power source 1460 for providing power when the inductive power outlet 1200 is disconnected from its power supply 1240.

Various auxiliary power sources 1460 may be used in embodiments of the trigger mechanism 1400 such as electrochemical cells, capacitors and the like, which may be configured to store energy while the inductive power outlet 1200 is connected to the power supply 1240 for use when the inductive power outlet 1200 is disconnected. Still other auxiliary power sources may include electricity generating elements such as solar cells, piezoelectric elements, dynamos or the like.

The circuit breaker 1420 may be configured to receive a disabling signal from the trigger and in response to provide an electrical connection between the power supply 1240 and the inductive power outlet 1200. Various circuit breakers 1420 may be used to disconnect the inductive power outlet 1200 from the power supply 1240 as suit requirements. For example, an electronic switch may be provided such as a Metal-Oxide Semiconductor Field-Effect Transistor (MOSFET) or the like the gate terminal of which may be configured to receive the electrical signals sent by the trigger sensor 1440. Other circuit breakers may include for example, a single pole switch, a double pole switch, a throw switch or the like.

The trigger sensor 1440 is configured to detect a release signal indicating the proximity of a possible inductive power receiver 1300. The trigger 1440 may be further configured to disable the circuit breaker 1420 when the release signal is detected. Optionally, an activator 1480 incorporated into the inductive power receiver 1300 is configured to produce the release signal which is detectable by the trigger 1440.

In one embodiment the trigger mechanism 1400 may include a magnetic detector such as a Hall Effect switch, reed switch or the like. The magnetic switch may be configured to detect an increase in magnetic field as a result of the approach of an activating magnetic element associated with the inductive power receiver 1300. It will be appreciated that a Hall Effect switch may be configured to detect the approach of an alignment magnet associated with the inductive power receiver 1300 which further functions as the activating magnetic element 1480 for the trigger mechanism 1400. It will be further appreciated that other magnetic switches may be used in other embodiments of the trigger mechanism as will occur to the skilled practitioner. Still other embodiments of the trigger mechanism may be used, for example, as described in the applicants co-pending patent application PCT/IL2010/001013 which is incorporated herein by reference.

The signal transfer system 1120 may include an inductive feedback channel 7120 such as described hereinabove in relation to FIG. 8. The regulator 1330 of the inductive power receiver may be in communication with a transmission circuit 1122 including a signal generator 1123, a switching unit 1125 and an ancillary load 1340. The signal generator 1123 may be a modulator 7123 such as described in FIG. 8. The switching unit 1125 may be a MOSFET 7125 such as described in FIG. 8. Variously, the ancillary load 1126 may be an electrical resistor 7126 such as described in FIG. 8, although other electrical elements such as capacitors, inductors and the like may alternatively or additionally serve as the ancillary load 1126. The transmission circuit 1122 may thus modulate the power drawn by the secondary inductor 1320. The modulated power may be detected by a signal detector 1124 associated with the inductive power outlet 1200.

The inductive power outlet 1200 includes a signal detector 1124 comprising a peak detector 1128 and a processor 1129. The peak detector 1128 may be configured to detect peaks in primary voltage across the primary inductor or primary current supplied to the primary inductor. Thus, the peak detector 1128 may be able to detect when the ancillary load is connected to the secondary inductor 1320. The processor 1129, such as the demodulator 7129 described above in relation to FIG. 8, may be provided to determine the frequency of peak pulses. Such an ancillary load may be selected from an ancillary resistor, an ancillary capacitor, an ancillary inductor or the like.

The signal transfer system 1120 may be used to transmit instruction signals such as identification signals, authentication signals, transmission signals, termination signals or the like, as well as digital communications to the inductive power outlet 1200 in the form of peak pulses having characteristic frequencies.

The regulator 1330 of the inductive power receiver 1300, which may include a controller, rectifier, capacitors, microcontroller, voltage monitor or the like, is in communication with the transmission circuit 1122.

The regulator 1330 may be operable to monitor induced secondary voltage across the secondary inductor 1320 and to compare the induced voltage with reference values. By comparing the secondary voltage with threshold values, the regulator 1330 may determine whether the secondary voltage lies within a permissible range of values. Accordingly, instruction signals may be selected by the regulator 1330 and generated by the transmission circuit 1122 instructing the inductive power outlet 1200 to adjust the induced voltage across the secondary inductor 1320.

It will be appreciated that in standby mode no voltage is induced across the secondary inductor 1320. As outlined in greater detail below, in standby mode, the regulator 1320 and transmission circuit 1122 may be further operable to respond to an activation voltage pulse induced across secondary inductor 1320 by generating an identification instruction signal (ID signal). The ID signal may be detected by the inductive power outlet 1200 thereby confirming the presence of the inductive power receiver 1300 and optionally its required operating parameters.

Figure 11A:
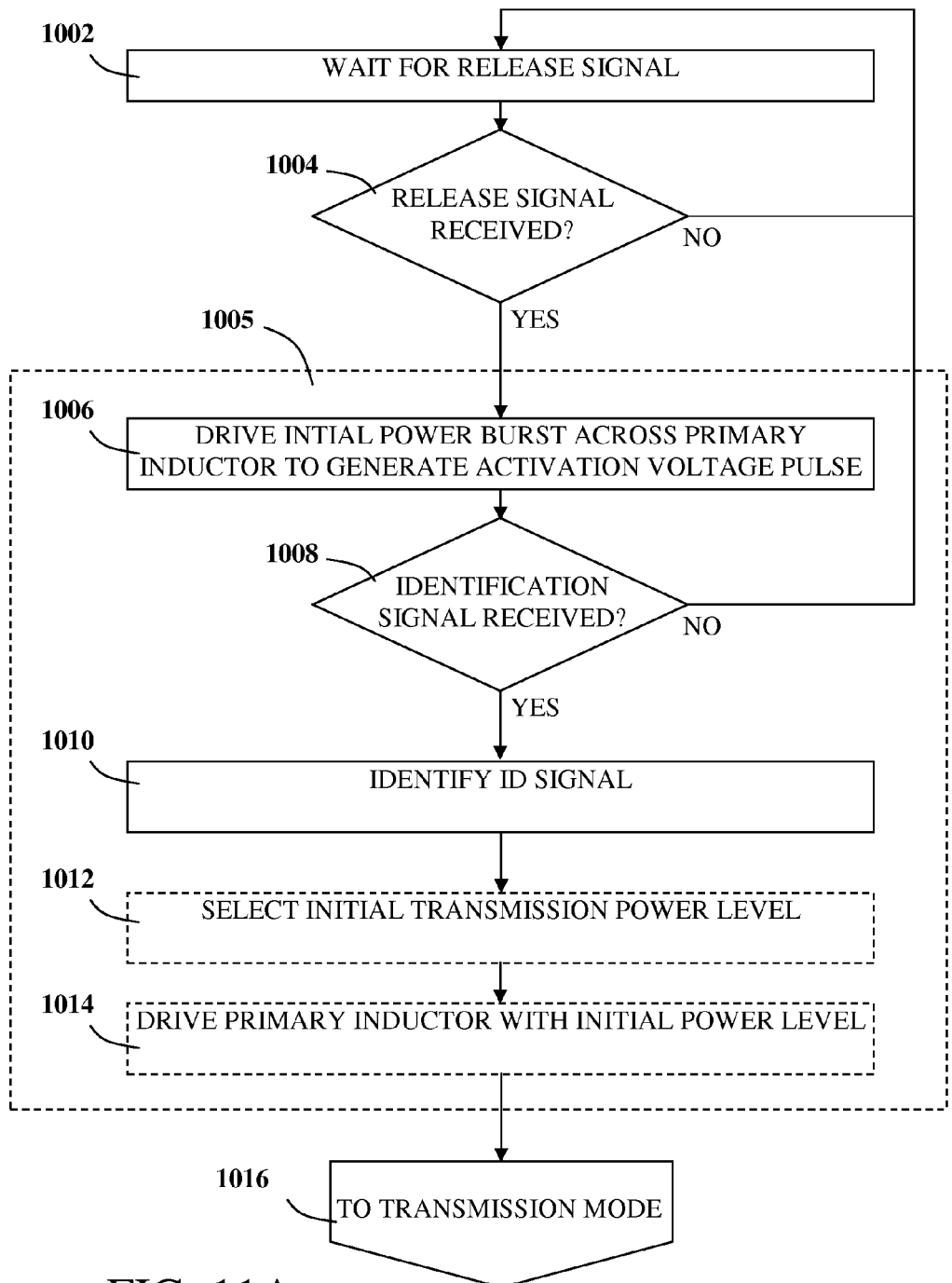
FIG. 11A is a flowchart representing selected stages of a possible protocol for transition from standby phase to the transmission phase in the inductive power outlet of an energy efficient inductive power outlet.

Reference is now made to FIG. 11A showing selected stages of a possible protocol for transition from standby phase to the transmission phase in the inductive power outlet. In standby phase, the dormant inductive power outlet waits for a release signal 1002.

The release signal indicates to the inductive power outlet that a compatible inductive power receiver may have been placed within transmission range. Such a release signal may be inter alia a change in local magnetic field associated with a trigger magnet in the inductive power receiver. Accordingly in one embodiment the inductive power outlet incorporates a Hall switch which is configured to detect changes in the local magnetic field. Other release signal mechanisms will occur to those skilled in the art such as signals detectable using piezoelectric elements, light sensors, audio sensors and the like as suit requirements.

If no release signal is received the outlet remains in standby mode 1004. When a release signal is detected by the outlet an authentication process 1005 is initiated during which the presence of the inductive power receiver is confirmed. The authentication process may start by the driver of the primary inductor producing an initial power of sufficient intensity to induce an activation voltage pulse across the secondary inductor of the inductive power receiver 1006. For example, a primary voltage may be driven across the primary inductor such that an activation voltage pulse of eight volts is induced across the secondary inductor.

The inductive power outlet may be operable to detect an ID signal in response to the initial power burst 1008. If the inductive power outlet receives an ID signal response from a recognized inductive power receiver, then the ID signal may be identified 1010 and the mode switched to transmission mode 1016. Optionally, depending upon the identity of the ID signal, an initial transmission power level may be selected 1012 according to what ID signal is received and the primary inductor driven with the initial transmission power level 1014. Alternatively, the initial transmission power level may be the transmission power level of the initial power burst.

Optionally, the initial power burst across the primary inductor may be repeated for a fixed number of iterations before the inductive power outlet reverts to standby mode. Variously, the driving voltage of the initial power burst may be constant or changing. According to one embodiment, the driver of the inductive power outlet may be operable to produce an initial 15 millisecond burst of oscillating voltage across which may repeated, say every 256 milliseconds or so. After five iterations or so, if no ID signal is received, the inductive power outlet may revert to standby mode.

Various ID signals may be used in embodiments of the present disclosure, for example, where the inductive power outlet includes a peak detector, as described hereinabove, a transmission circuit may be used to modulate the primary voltage across the primary inductor, or primary current drawn by the primary inductor, with peak pulses having characteristic frequencies which are identifiable as generated by recognized inductive power receivers. In one embodiment, ID signals may peak pulses having characteristic frequencies selected from 500 hertz, 1 kilohertz and 8 kilohertz. The selected characteristic frequency of the ID signal may provide further instructions to the inductive power outlet for example relating to required transmission parameters, user specific data, billing information or the like.

The power level of the induced voltage may be regulated by adjusting a variety of parameters of the driving voltage. For example, where non-resonant power transmission is used, such as described hereinabove, the power level may be determined by the selected operating frequency. Optionally, the initial voltage across the primary inductor may be steadily increased by decreasing the driving frequency from 476 kilohertz to 313 kilohertz during the initial burst. Alternatively, a the power level may be selected by adjusting the duty cycle or amplitude of the driving voltage.

Figure 11B:
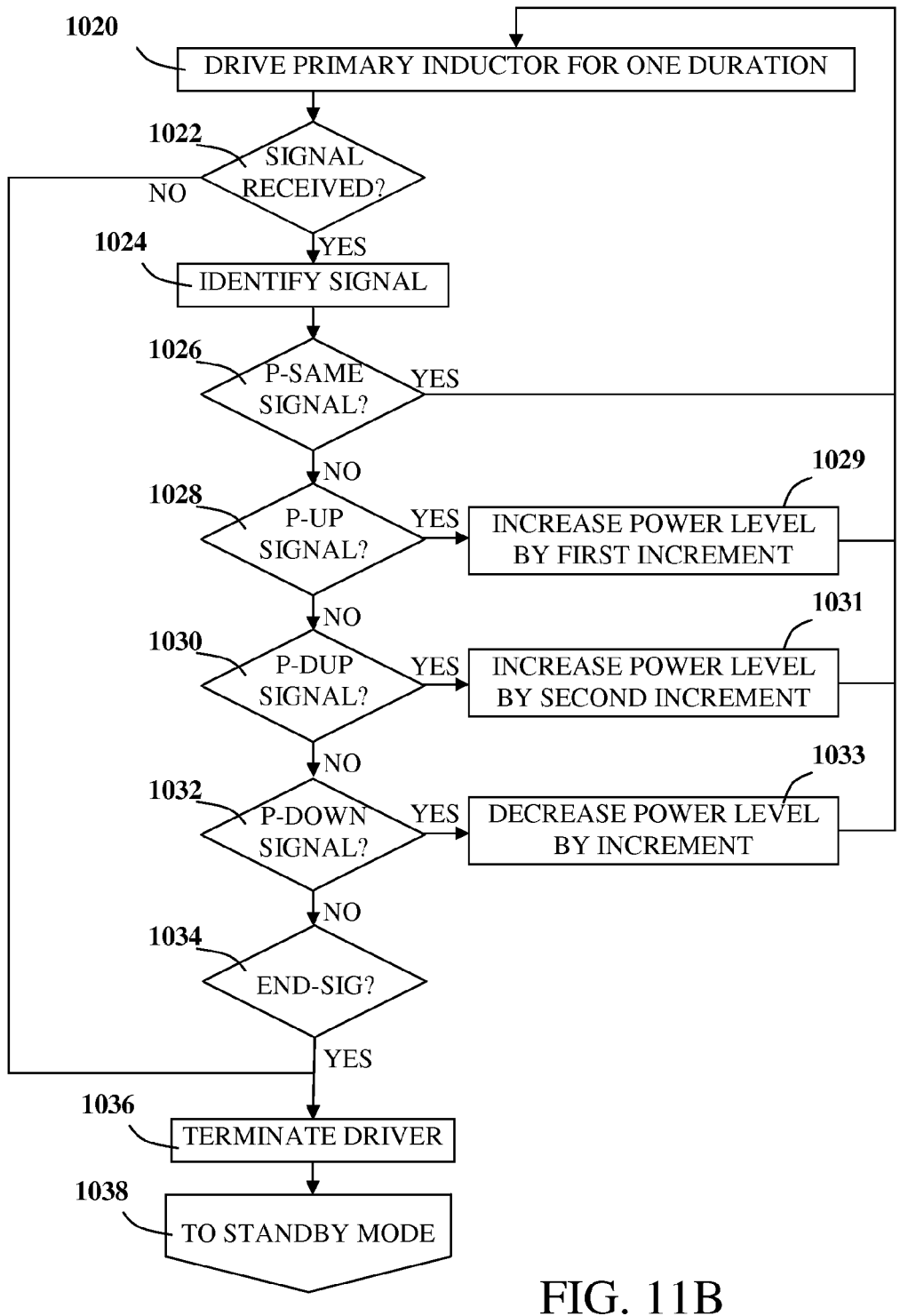
FIG. 11B is a flowchart representing a possible transmission mode protocol for an inductive power outlet.

Reference is now made to FIG. 11B representing a possible transmission mode protocol for use with an inductive power outlet. Optionally, such a protocol may be initiated by the transition protocol of FIG. 11A, alternatively an inductive power outlet may be activated in other ways, such as by manually operating a power switch, connecting to a mains power supply or the like.

In transmission mode, the inductive power outlet may be operable to drive the primary inductor for a limited time duration 1020, for example for 10 milliseconds or so. At the end of the limited time duration, the outlet may be operable to terminate the operation 1036 unless an instruction signal is received 1022. Such a system may enable an energy efficient inductive power outlet to draw power only when required and to shut down when not needed. If an instruction signal is received from the inductive power receiver, the signal may be identified 1024 and acted upon, for example, as follows: if a perpetuation signal P-SAME is received from the inductive power receiver 1026, then the driver may continue to drive the primary inductor for a further duration; if a first power increase signal P-UP is received from the inductive power receiver 1028, then the driver may increase the power level by a first incremental value 1029; if a second power increase signal P-DUP is received from the inductive power receiver 1030, then the driver may increase the power level by a second incremental value 1031; if a power decrease signal P-DOWN is received from the inductive power receiver 1032, then the driver may decrease the power level by an incremental value 1033; or if a termination signal END-SIG is received from the inductive power receiver 1034, then the driver may be terminated 1036, thereby ceasing to drive the primary inductor and the inductive power outlet reverting to standby mode.

To better explain the transmission protocol and for illustrative purposes only, an example of the protocol is described below in in which the inductive power outlet drives a non-resonant transmission voltage. The protocol may also be applicable to resonant transmission systems.

The instruction signals may comprise modulated peak pulses with each signal having a characteristic frequency. In one particular embodiment the perpetuation signal P-SAME may have a characteristic frequency of 500 hertz, the first power increase signal P-UP may have a characteristic frequency of 8 kilohertz, the second power increase signal P-DUP may have a characteristic frequency of between 1.5 and 5 kilohertz, the termination signal END-SIG may have a characteristic frequency of 250 hertz. It will be appreciated that other characteristic frequencies may alternatively be used. Indeed, where required, other instruction signals, such as additional power decrease signal, for example, may be additionally or alternatively transferred as suit requirements.

Referring again to FIG. 2, as noted above, where the transmission frequency is selected from the non-resonant region 8 above the resonant frequency of the system the output power of the secondary inductor may be regulated by increasing or decreasing the driving frequency by incremental amounts. According to one embodiment in which the transmission frequency is around 10 megahertz the incremental frequency steps 6f may be selected from within a permissible range of 277 kilohertz to 357 kilohertz or so.

In one system the driver 1230 (FIG. 10) of the inductive power outlet may include a microcontroller unit operable to calculate the incremental frequency value $f_{op+1}-f_{op}$ according to the formula:

$$f_{op+1} - f_{op} = \frac{F_{sys}}{\text{divider value}} - \frac{F_{sys}}{\text{divider value} - 1}$$

where $F_{sys}$ is the transmission frequency of the driver, and the divider value is an integer value. Where required, different incremental values may be used for increasing and decreasing the voltage or power.

As noted, two power increase signals P-UP and P-DUP may request different incremental power increases. Accordingly the second power increase signal P-DUP may be used to step up power by larger increments, say twice the size of the standard increments. This may be useful for example where the initial voltage is particularly low.

Figure 11C:
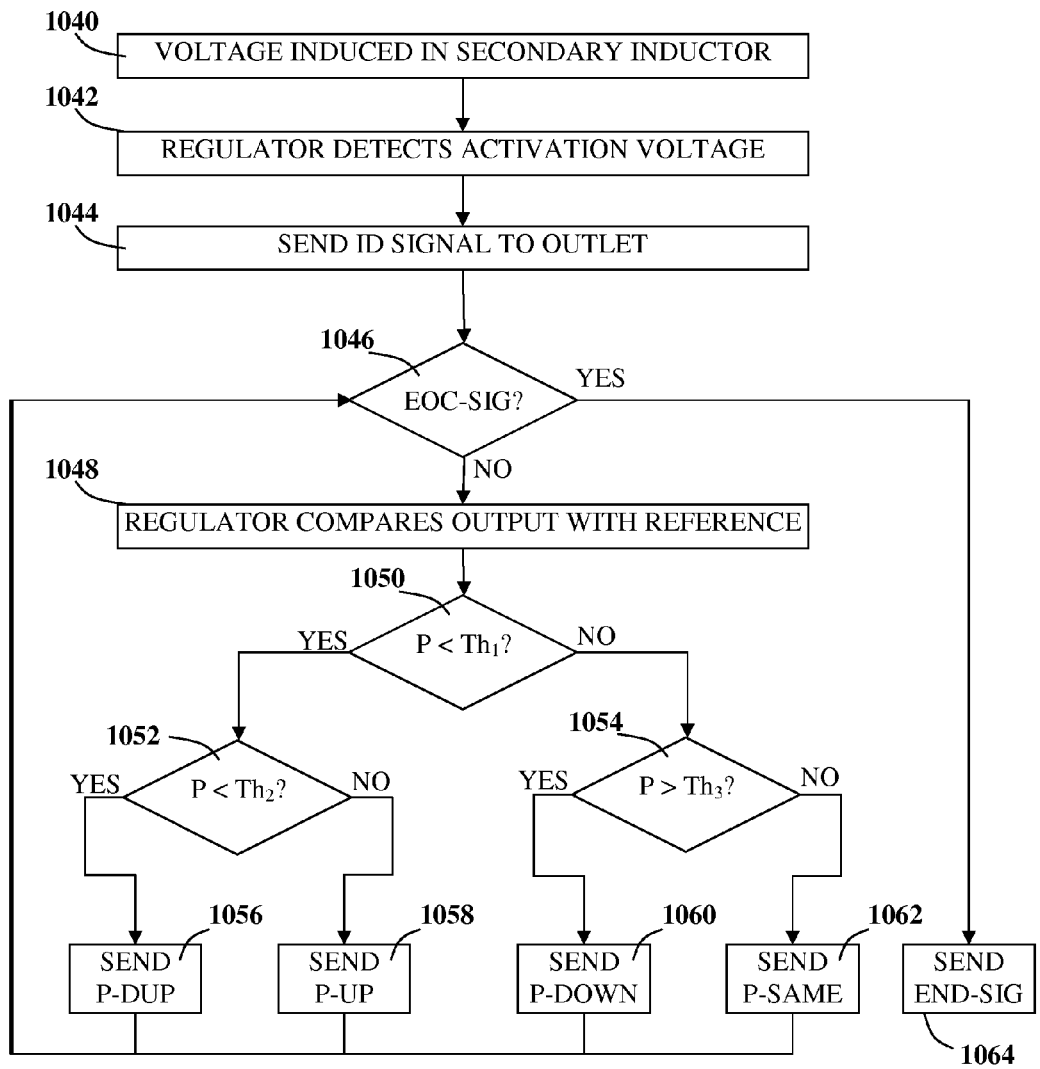
FIG. 11C is a flowchart representing operation of an energy efficient inductive power receiver.

Turning now to the inductive power receiver, reference is made to FIG. 11C showing possible operational steps during inductive power reception. The inductive power receiver may be activated when a voltage is induced across the secondary inductor 1040, when the regulator may detect the activation voltage 1042 an identification signal may be sent to the inductive power outlet 1044.

Such an identification signal (ID signal) may serve to switch the inductive power transmitter to transmission mode as described above in relation to FIG. 11A. For example, an induced voltage of about 8V and producing a current of about 3 milliamps and lasting about 5 milliseconds or so, may power a microcontroller associated with the regulator to activate the sending of an ID signal to the inductive power outlet. In one embodiment, a transmission circuit 1122 (FIG. 10) may be used to produce a modulated peak pulse having a characteristic frequency selected from 500 hertz, 1 kilohertz, 8 kilohertz or the like. Variously, the inductive power receiver may select an ID signal such that predetermined transmission parameters may be selected for operating the inductive power outlet.

It is noted that during power transfer, the inductive power receiver is operable to periodically send instruction signals to the inductive power outlet. The instruction signals may be selected according to various factors as outlined below.

Where, the inductive power receiver is operable to detect an end-of-charge command EOC-SIG indicating that the electric load, such as an electrochemical cell or the like, requires no more power 1046. If such an end-of-charge command is detected, the inductive power receiver may be operable to send a termination signal END-SIG to the inductive power transmitter 1064. As outlined above in relation to FIG. 11B, the termination signal instruct the inductive power outlet to revert to standby mode. According to one embodiment, the termination signal may comprise a modulated peak pulse having a characteristic frequency of 250 hertz. It will be appreciated that such a termination mechanism may enable an energy efficient inductive power transfer system to draw power only when required and to shut down when not needed thereby reducing energy wastage.

If no end-of-charge command is detected, the regulator may be configured to compare the output of the secondary inductor to at least one reference value 1048. For example, the regulator may compare secondary voltage to reference values stored in a memory element. Alternatively, reference values may be calculated by a processor associated with the inductive power receiver to suit requirements.

If the power is below a first lower threshold value $Th_1$ 1050, a first power increase signal P-UP may be sent to the inductive power outlet 1058. The regulator may further compare the power to a second threshold value $Th_2$ 1052, if the power is also lower than the second threshold value $Th_2$ a second power increase signal P-DUP may be sent to the inductive power outlet 1056.

Where the power is above the first lower threshold value, the power may be compared to at least one an upper threshold value $Th_3$ 1054. If the power level is greater than the upper threshold value $Th_3$, then a power decrease signal P-DOWN may be sent to the inductive power outlet 1060.

It is particularly noted that where the power level is neither greater than the upper threshold value $Th_3$ nor lower than the lower threshold value $Th_1$, then a perpetuation signal P-SAME may be sent to the inductive power outlet 1062. Thus when even when no action is required a signal is sent at least one instruction signal may be sent to the inductive power outlet during each time duration. Accordingly, the inductive power receiver may periodically indicate its continued presence to the inductive power outlet. It will be appreciated that when the inductive power receiver is removed from the inductive power outlet, no instruction signals will be passed therebetween. As indicated above in relation to FIG. 11B, the inductive power outlet may be configured to shut down when no such signal is received.

Although only five instruction signals are described hereinabove, other instruction signals may be additionally be transferred as required. Various instructions may occur to those skilled in the art, for example indicating that the power is outside still further threshold values, requesting greater power resolution or such like.

Additionally or alternatively, the transmission circuit 1122 (FIG. 10A) may be used to send digitally encoded data from the inductive power receiver 1300 to the inductive power transmitter 1200 via the inductive couple formed between the secondary inductor 1320 and the primary inductor 1220. Accordingly, the transmission circuit 1122 may be operable to generate a data transfer signal which may be used to send a digital communication.

Such digital communications may carry information relating to various factors such as operational data, supplementary data, identification data or the like. For example, operation data may include load characteristics, load identity, desired operating parameters, actual operating parameters or target operating parameters, such as induced voltage, induced current, required current, operating temperature, charge level, or such like. Supplementary data may include location data, synchronization of data, media files say, streamed media or the like.

Where appropriate, such digital communications may be used to provide additional power transfer management. For example, the digital communications may be used to communicate inter alia data relating to: the resonant frequency of the system, the selected range of operational frequencies, the sizes of increment values of frequency or power by which the driver changes the power level when a P-UP signal, P-DOWN signal, P-DUP signal or the like is received, load or receiver specific maximum power levels, limits above which the inductive power transmitter should not transmit power, power limiting for safety, etc.

It is particularly noted that the digital communication may be used to pass identification data between the inductive power receiver and the inductive power outlet. Identification data may include, for example, a device specific identity code, a user specific identity code, a receiver specific identity code or the like. Such identification codes may be used to pair a specific inductive outlet to a specific inductive receiver. It is noted that identification codes may be of particular utility in commercial systems where the identity of the user or receiver may be used to determine the permissions of that receiver to draw power from that outlet, to determine billing procedure for that power drawing action, to monitor the behavior of a particular user or receiver or the like. Still further uses for the data communication will occur to those skilled in the art such as those described in the applicants copending applications, U.S. Ser. Nos. 61/682,604 and 61/584,268, which are incorporated herein by reference in their entirety.

It is further noted that identification of the receiver may be used to determine user specific actions such as adjusting local environment. For example in a vehicle based system a inductive transmitter may use identification data received from an inductive power receiver to adjust the mirror, seat orientation, seat temperature, air conditioning, radio selections and the like to suit the personal preferences of the user. In another example, in a household environment the inductive transmitter may use identification data to cancel alarms, adjust the ambience, lighting, media preferences or the like to suit the user.

Furthermore, identification data may be used for billing purposes or may be used to determine personalized advertising targeted to the user.

Digital communications may be transmitted using the signal transfer system of the disclosure. It will be appreciated that digital communications may be constructed from multiple bits of information each of which may have a logic state 0 or a logic state 1.

The signal transfer system described herein may assign logic state peak pulses having differing characteristic frequencies to represent logic state 0 and logic state 1 and therewith to construct digital data. By way of example a logic state peak pulse may be assigned a characteristic frequency such as 2 kilohertz, 4 kilohertz, 5 kilohertz, 6 kilohertz, 10 kilohertz, 50 kilohertz or the like.

Optionally, a dedicated characteristic frequency peak pulse may be reserved for a logic state peak pulse. Alternatively, where required, a logic state peak pulse may share a characteristic frequency with one or more instruction signals.

It will be appreciated that communications, or messages, may be constructed from multiple bits. Strings of bits may represent bytes of information. Where appropriate, a byte may be characterized as a string of 10 bits: a BitST, Bit0, Bit1, Bit2, Bit3, Bit4, Bit5, Bit6, Bit7 and BitSP. The initial bit BitST may be a START bit used to indicate that the following string of eight bits represent a byte and BitSP may be a STOP bit used to indicate that the byte has terminated. According to a particular example BitST may set to logic state 0 to indicate initiation of a byte of data and BitSP may be set to logic state 1 to indicate the byte's termination.

The processor 1129 (FIG. 10A) associated with the peak detector 1128 of the inductive power outlet 1200, may be operable to interpret peak pulses of various characteristic frequencies differently depending upon the timing of the transmission and the operational phase during which it is transmitted.

For example a peak pulse having a certain characteristic frequency which is used as an instruction signal during power transmission, such as described above, may be used as a logic state pulse signal otherwise. Accordingly, in a non-limiting example, during an initial identification phase, a peak pulse having the characteristic frequency of an ID signal may be used to represent logic state 0 and a peak pulse having the characateristic frequency of the P-SAME, say, signal may be used to represent logic state 1. Whereas during transmission phase P-SAME may be used to instruct the driver to continue to drive the primary inductor.

It is further noted that during transmission, one logical state may be represented by an unambiguous characteristic frequency and the other logical state may be represented by any one of a set of other characteristic frequencies.

For example, logic state 0 may be represented by its own characteristic frequency MsgBIT, say 6 kilohertz. By contrast, logic state 1 may not have its own unique characteristic frequency. Instead, any of the other characteristic frequencies may be interpreted as representing logic state 1 by the processor 1129 (FIG. 10A) associated with the peak detector 1128 of the inductive power outlet 1200.

It is noted that, where multiple characteristic frequencies are all interpreted as the same logical state, the selection of the characteristic frequencies used may convey another level of information concurrently with the digital message. Thus, for example, during transmission, a digital message may be communicated using the MsgBIT frequency to represent logic state 0 while selection of the characteristic frequency for logic state 1 may be determined by the transmission requirement of the system at that instant. Accordingly, in the example: if the power received by the inductive receiver is below a required level, the power increase signal P-UP may be used to represent logic state 1, such that the driver also increases the power level by an incremental value, if the power received by the inductive receiver is above a required level, the power increase signal P-DOWN may be used to represent logic state 1, such that the driver also decreases the power level by an incremental value, if the power received by the inductive receiver is within a required range, the power increase signal P-SAME may be used to represent logic state 1, such that the driver continue to drive the primary inductor with the same power level, and if the load requires no more power, the termination signal END-SIG may be used to represent logic state 1, such that the driver ceases to drive the primary inductor and the inductive power outlet reverts to standby mode.

Accordingly, it is a particular feature of the present disclosure that digital communications may be transferred from the inductive receiver to the inductive outlet concurrently with power transmission regulation signals.

It is also noted that the digital communication may be used to provide a digital ping. Optionally, a digital ping phase may be used to identify that the receiver is valid for example. In order to engage with a possible receiver, a digital ping is generated. This digital ping may have a pre-defined structure regarding the frequencies and timing that should be used. If sufficient power is delivered to the receiver, it will respond by modulating the power signal according to the communication protocol. Where the transmitter received a valid signal from the receiver, it may continue to an identification phase without removing the power signal or a power transfer phase.

Optionally, inductive power receivers may have characteristic identification codes MACID which may be communicated in an ID signal RXID, accordingly, the receiver may be operable to identify itself to the inductive power outlet by sending the identification code MACID in the ID signal RXID.

According to one example protocol, where the receiver responds to the digital ping, the receiver may transmit a characteristic frequency peak pulse, say the P-SAME signal. The receiver may be operable to transmit such a signal within a milisecond after entering the ping phase and may continue transmitting this signal for an identification period $t_{ID}$ before continuing to an identification phase. Optionally, entry to the digital ping phase on the receiver may be considered as the point where the bridge voltage of the Receiver reaches an initial rectified voltage $V_{start}$ required to bring the communication and control unit to an active state.

Where appropriate, the RXID message structure may comprise a string of bytes such as described herein. The byte string may comprise a preamble byte, a message ID byte, the MACID, which may itself comprise a string of six bytes, and a two byte cyclic redundancy check (CRC). Optionally, in a particular embodiment, the Preamble byte is fixed to 0x00 and the Message ID byte is set to 0xAA. It will be appreciated that other messages may be defined as suit requirements. Optionally, where required, a Certification-Version byte may be included possibly between the messageID byte and the MACID field.

According to a particular embodiment, the receiver may use the following flow of operation: On the completion of the Digital Ping phase, prior to enabling charging to the device, the receiver may transmit a "RXID message", to make sure it is a fully compliant device. A guard-time of 20 miliseconds is provided, during which the transmitter calculates the CRC of the RXID message and the receiver transmits P-SAME signals. Once the guard time is over, the receiver may enter a power transfer phase.

The inductive power outlet may receive the RXID message and calculate the CRC, while maintaining the power level stable. If the CRC is valid, the inductive power transmitter will move to power transfer phase. If the CRC was not valid, the inductive power transmitter will remove the power carrier and transition to the standby phase. It may then restart the Digital Ping phase with the receiver and repeat the identifications attempt.

By way of illustration selected features and parameters of a particular embodiment of a wireless charging system is described hereinbelow comprising a charging surface (transmitter, TX) and the secondary-side equipment (receiver, RX). The coils in the charging surface and in the secondary equipment are magnetically coupled to each other when a portable device (that contains the receiver) is placed on the charging surface. Power is then transferred from the transmitter to the receiver via coupled inductors (e.g. an air-core transformer).

Figure 12:
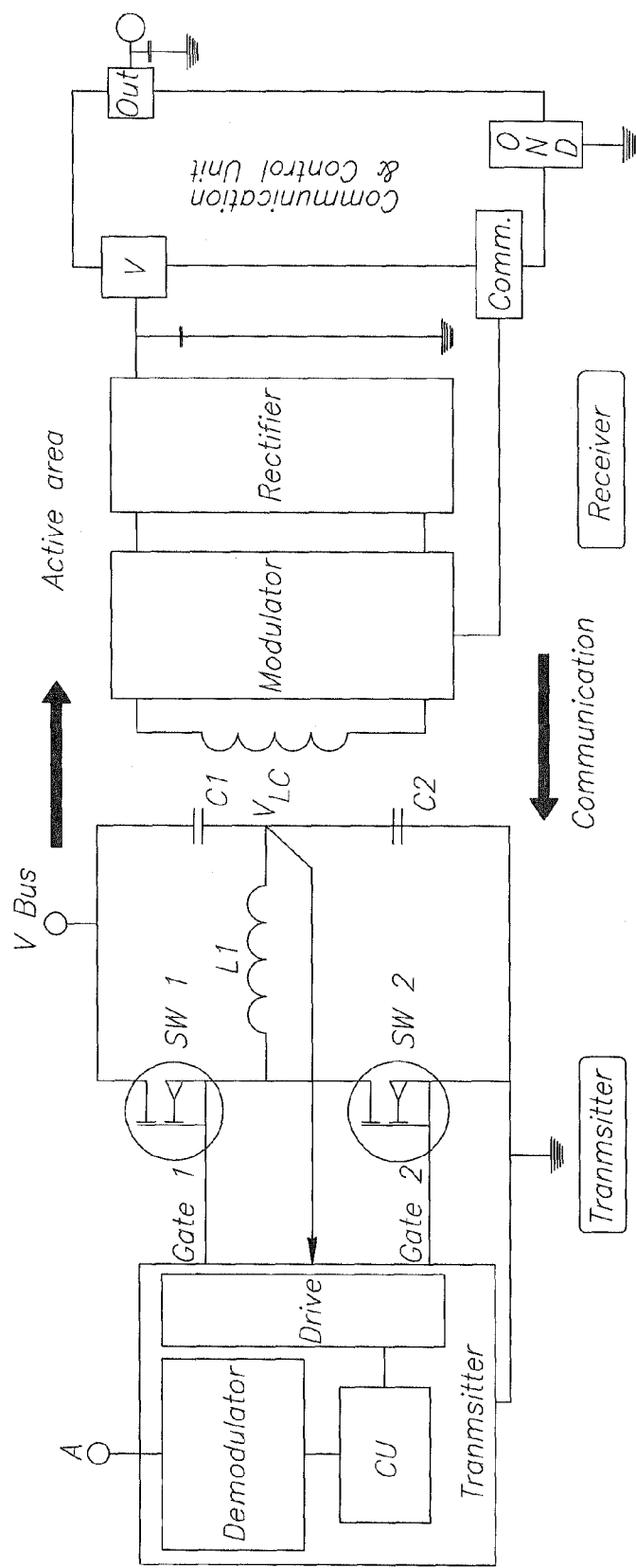
FIG. 12 is a schematic representation representing selected components of an embodiments of the inductive power transfer system.

FIG. 12 illustrates selected components of the wireless charging system.

Basic functions of the system may include: receiver—regulates the output voltage and controls the received power by modulating the power signal according to the suitable communication protocol; transmitter (also referred to as an outlet)—demodulates the signals and changes the frequency to adjust the delivered power; by controlling the operation frequency, delivered power from the transmitter to the receiver can be increased and decreased.

The amount of power transferred is controlled by sending feedback communication from the receiver to the transmitter (e.g., to increase or decrease power). The receiver communicates with the transmitter by changing the load seen by the transmitter. This load variation results in a change in the transmitter coil current, which is measured and interpreted by a processor in the charging surface. The wireless charging system uses frequency-based signaling. It also includes identification and end of charging signals.

The wireless charging system can be in one of the following phases: Standby; Digital Ping; Identification; Power Transfer; and End of Charge (EOC).

Figure 13A:
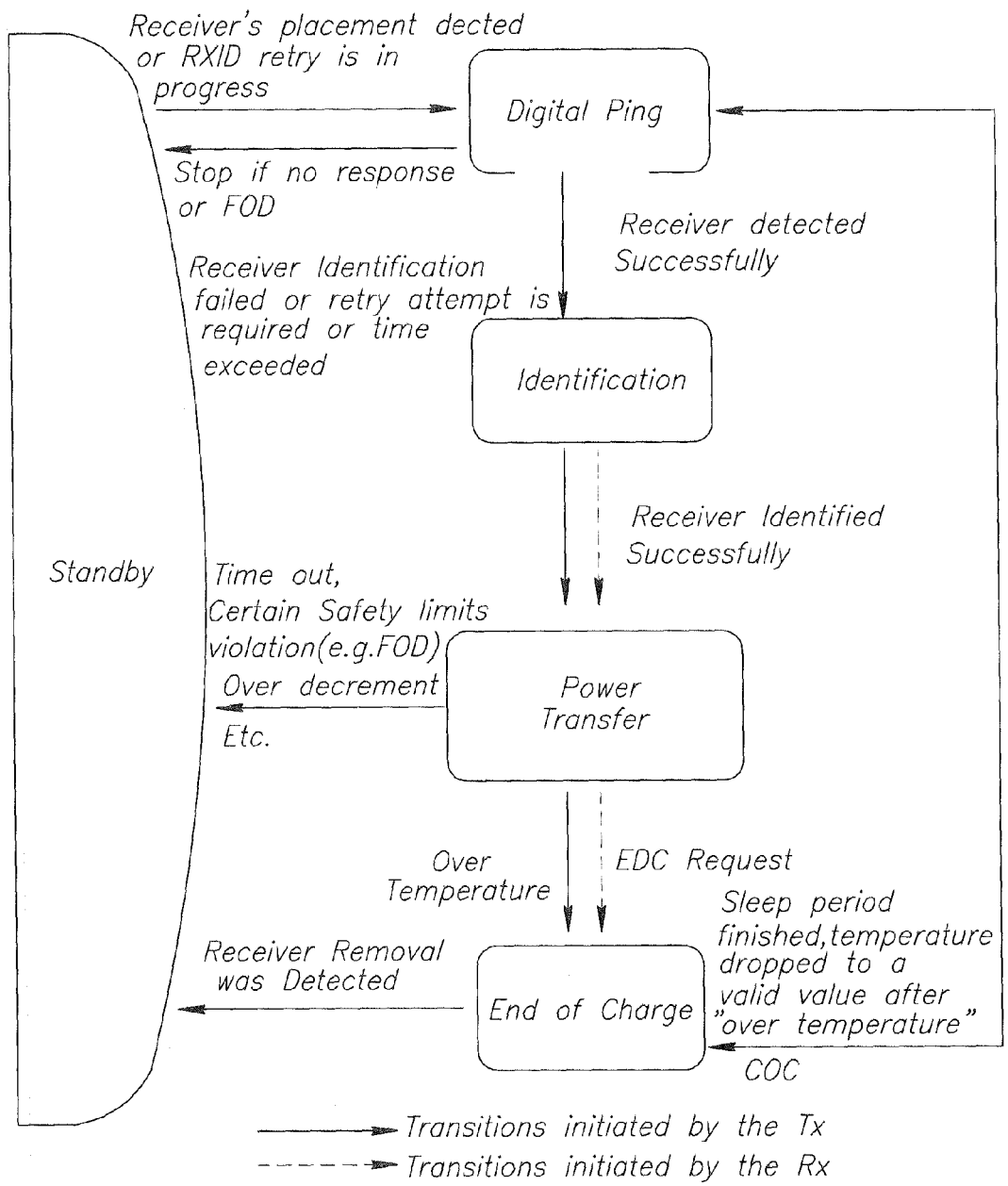
FIGS. 13A and 13B are illustrations of state machines for respectively an inductive transmitter and an inductive receiver.
Figure 13B:
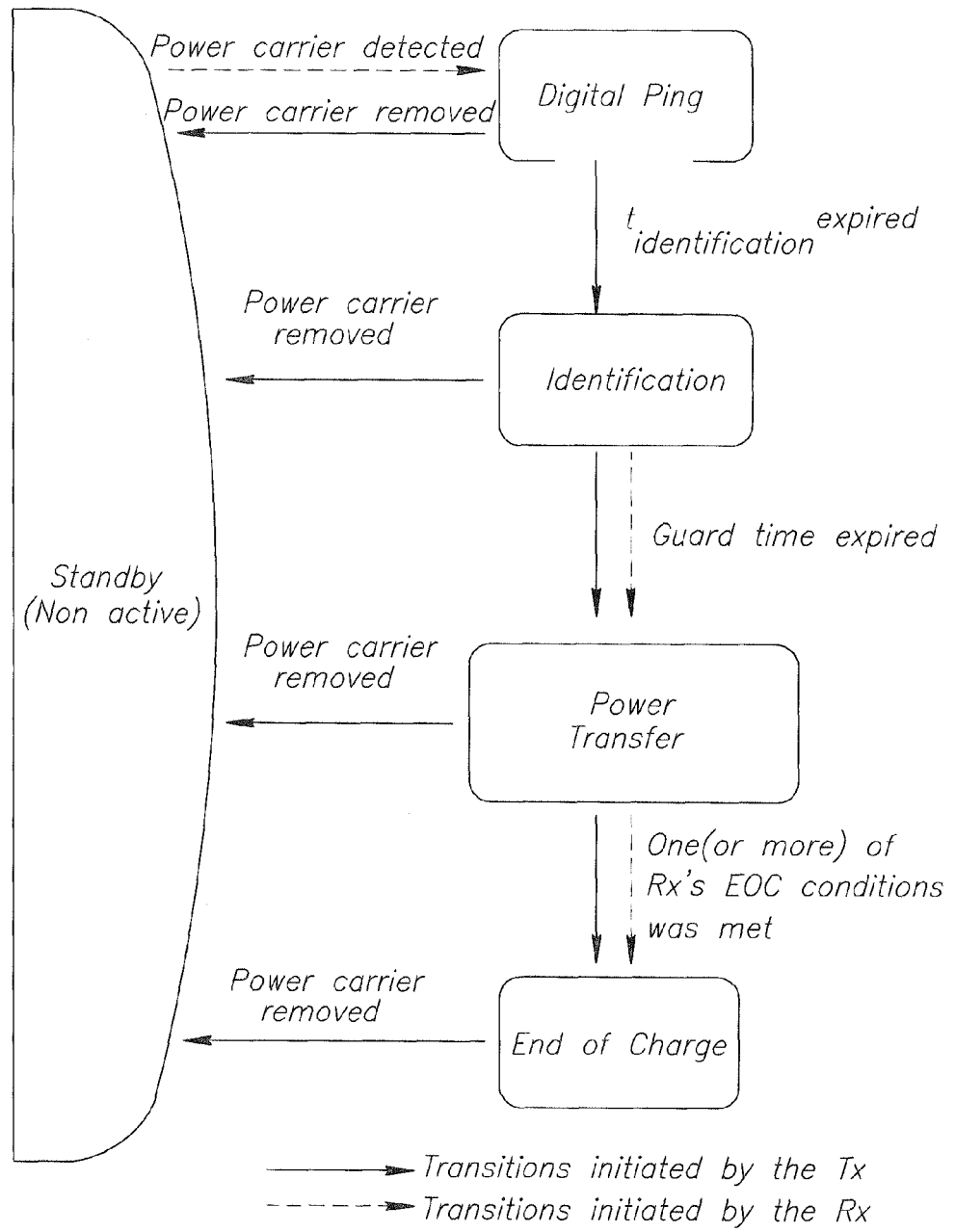

As mentioned herein, the transition from one phase to another may be the result of the communication between the receiver and the transmitter. The transition between Standby phase and Digital Ping phase includes the use of a detection mechanism that will be described herein below. FIGS. 13A and 13B illustrate, respectively, the state machine controlled by this communication from both the transmitter and from receiver perspectives.

Please notice that the transmitter may transition to Standby phase from any of the states based on internal policy decisions in addition to the transitions described below.

During the Standby phase, the transmitter monitors its surface to detect a possible receiver's placement. There are a few methods that can be used to detect a possible placement of a receiver, e.g., monitoring the change in the magnetic field, monitoring the change in capacitance, and monitoring changes in the overall inductance of the system. In addition, two or more of the above may be used in combination, mutatis mutandis.

The system will continue to the Digital Ping phase if a possible placement of a receiver was detected using one of the above methods.

The purpose of the Digital Ping phase is to engage with a possible receiver and to identify that it is a valid receiver (and not a foreign object that creates, e.g., a parasitic current). To engage with a possible receiver, a Digital Ping is generated having a predefined structure regarding the frequencies and timing that should be used. If sufficient power is delivered to the receiver, it will respond by modulating the power signal according to the communication protocol used by the wireless charging system. If the transmitter receives a valid signal from the receiver, it will continue to the Identification phase, without removing the power signal. In case identification is not supported by the transmitter, it will continue to the Power Transfer phase.

If an EOC request was received from the receiver, the system will continue to the End of Charge phase. If no response was detected, the system will return to the Standby phase.

Support for the Identification phase on transmitters is optional.

Each receiver will have a unique identification string, and upon completion of Digital Ping, it is required to identify itself to the transmitter to verify it is a fully compliant device. As part of this identification the receiver sends its identification string.

Transmitters that support the Identification phase validate the identification string. If the identification string is validated successfully, the system will continue to the Power Transfer phase. If the validation failed, or was not completed in time, the system phase would change to Standby.

In this phase, the transmitter will provide power to the receiver, by controlling the primary cell current according to the control data received from the receiver. In addition, the transmitter verifies that no violation of proper operation boundaries and safety limits occurred (e.g. foreign object detection).

If EOC request was received from the receiver, or the temperature exceeds the maximum defined value, the system removes the power signal and continues to the End of Charge phase. In any other case of violation (as specified above), the system will remove the power signal and returns to Standby phase. A new charging cycle will begin by simply removing the receiver from the surface and placing it again.

The transmitter shall enter the EOC phase if an End of Charge (EOC) request is received from the receiver (charging completed) or temperature readings in the transmitter exceeded the predefined range.

If the reason for entering this phase was an EOC request, the transmitter should remove the power carrier and wait for a period of $t_{sleep}$ (the typical $t_{sleep}$ depends of the type of transmitter, as defined below). After $t_{sleep}$ expires, the transmitter will continue to the Digital Ping phase to engage again with the receiver that is placed on the surface. The transmitter also monitors the surface for a possible removal of the receiver during the sleep time of the EOC phase. If a removal of the receiver was detected, the transmitter will return to the Standby phase.

If the reason for entering this phase was high temperature readings in the transmitter, the transmitter monitors the transmitter's temperature. If the temperature drops to a valid value, the transmitter will continue to the Digital Ping phase. The transmitter also monitors the surface for a possible removal of the receiver during this time. If a removal of the receiver is detected, the transmitter should return to the Standby phase.

FIG. 14 summarizes different messages used during the different operational phases. In each row, the text in angle brackets ("<" and ">") marks operations initiated by the receiver/transmitter. Non-bracketed text marks the corresponding reaction of, respectively, the transmitter/receiver.

According to some embodiments, the wireless charging system requires compliant receivers to respond with P-DOWN signal during the Digital Ping phase.

The transmitter basic design consists of the following functional blocks: a resonant circuit comprising a primary coil. Series and/or parallel capacitances can be used in order to enhance the power transfer efficiency; Frequency driver in a half-bridge (or full-bridge) topology; Power supply, used to power the different peripherals and as a power input to the half-bridge converter; Input DC/DC converter, used to regulate the power to the control unit; Data demodulator, used to extract the modulated data sent by the receiver; Magnitude detector unit that monitors the primary coil voltage; and Detection unit, which is responsible for detecting a possible receiver placed on the surface of the transmitter.

Figure 15:
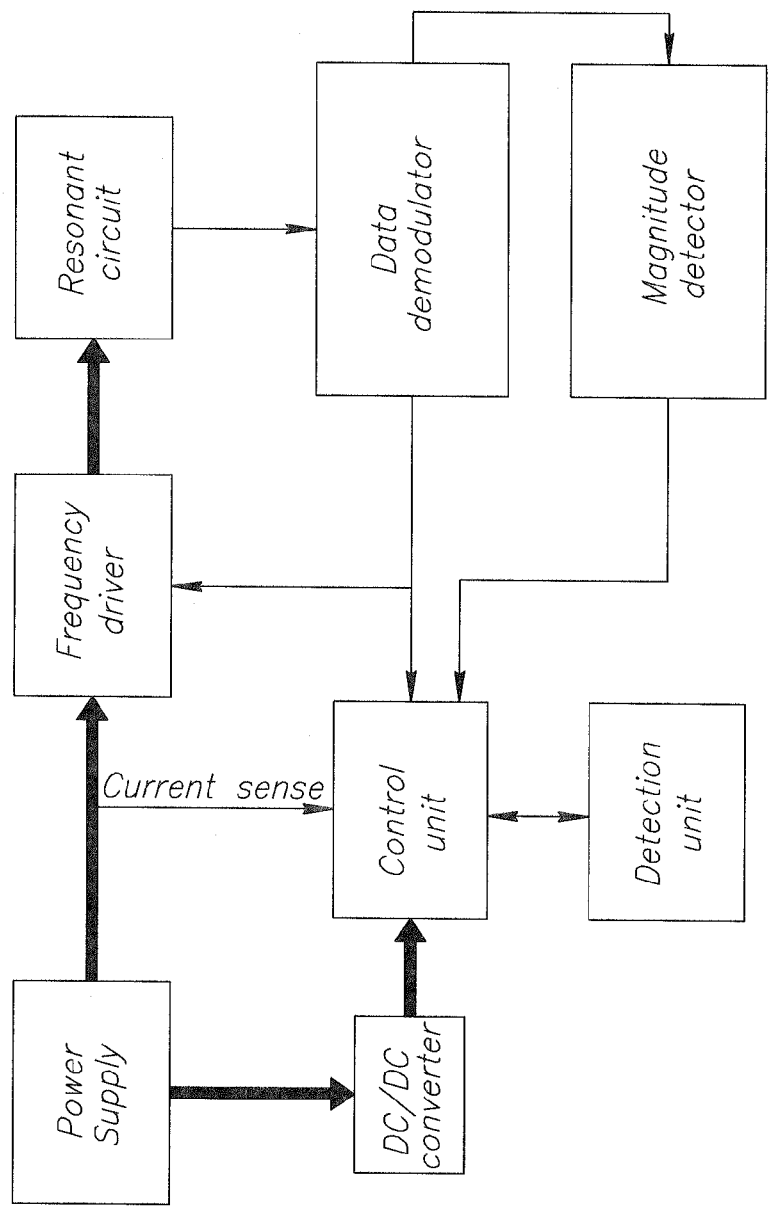
FIG. 15 is a block diagram of selected elements of an inductive power transmitter.

FIG. 15 illustrates how these blocks are combined in the transmitter.

The transmitters is designed to deliver output of up to 9 W. The actual power output of the receiver would depend on the alignment of transmitter and receiver coils and the efficiency of the specific receiver design.

Several transmitter types are suitable for integration in various points in the user environment, such as accessory pad, table surface, car interiors, etc. FIGS. 16A and 16B summarize an example of a transmitter types with which the wireless charging system is expected to work.

The following sections provide a more detailed description of these transmitter types and cover the features relevant for designing a compatible receiver.

As illustrated in FIG. 17, the transmitter comprises, inter alia: Aluminum base (typically); and Plastic top cover of 1.5 mm thickness.

FIGS. 18, 19, 20, respectively, summarize the construction of the primary coil, the resonant circuit, and the electrical details. The shielding may be standard circular ferrite 40×1 mm, and a disc magnet N52 10×1.5 mm, 1600-2000 Gauss may be provided as an alignment aid.

The receiver basic design would usually consist of the following functional blocks: a resonant circuit comprising a secondary coil. Optional series and parallel capacitances can be used in order to enhance the power transfer efficiency; a rectification circuit that is responsible for the full-wave rectification of the AC signal; a communications modulator, usually using a resistor or capacitor; an output voltage regulator; a rectified current sense; and the Communication and Control Unit is responsible for performing the required power control algorithms and methods, activating the communication modulator and monitoring additional peripherals required for a proper operation of the system.

FIG. 21 illustrates one non-limiting example of how these blocks may be combined in the receiver.

The overall system efficiency must be acceptable and should exceed 60%. The above requirement applies for receiver engagement with any misalignment, and any load in the range of Imax−0.5*$I_{max}$. For loads that are in the range of 0.5 $I_{max}$-0.25 $I_{max}$, a minimum efficiency of 50% should be met.

The engagement with the transmitter should be of minimal effort for an end-user and appear to be immediate to them.

Successful engagement is expected when the center of a receiver coil is freely placed within 3 mm of the center of transmitter coil on the surface of the transmitter. For transmitter types whose active area does not support that level of misalignment, it is expected that the employed alignment aid would guide a receiver that is freely placed within these limits to a location that would provide proper operation.

Successful engagement notification should be presented to the user of the charged device whenever possible.

For devices that use wired charging in addition to PMA wireless charging, the time elapsing from transmitter engagement until notification must be up to 1 sec longer than the time elapsing from an external wired charger connection until notification.

According to some embodiments, the maximum transition time between the Standby phase and the Power transfer phase (where all constraints on communication and timing are met), must not exceed 1 sec.

A receiver may have a vendor-declared nominal output voltage range $V_{nom}$.

The output voltage ripple of the receiver must be limited to a defined range ($V_{rip\_oper}$) The ripple requirement must be maintained from for increase or decrease in the full range of loads supported by the receiver. The ripple range will be vendor declared and must match the device to which the receiver is coupled.

The vendor may also define a higher level of negative transient ripple that applies to scenarios when load is switched ($V_{rip\_trans}$).

For generic receivers that are not coupled to specific devices, the ripple level must be limited to ±5% of the operating voltage. A short 100 msec transient ripple of up to 20%±5% may be allowed when load is switched.

For devices that use wired charging in addition to wireless charging, the matching receiver may be designed such that the overall time required to charge a device fully will be comparable to the time required to charge the device fully via wired charging.

The wireless charging time should not exceed the wired time by more than about 25%.

The above limitation does not apply to devices that enforce a defined current limit on their wireless charging input.

Receiver design must also ensure that during the full charge cycle the charged device will continually indicate ongoing charging to user. The receiver may vary or even use discontinued charging periods, but only as long as the matching charged device continues to inform the user of ongoing charging.

The receiver design should also ensure that during the full charge cycle the temperature of the receiver surface would not reach the $T_{Rx\_max}$ when operating with ambient temperature of up to 30 deg on a PMA-1 reference transmitter. The receiver may employ temperature based current limiting in order to achieve this target.

A receiver should not emit during its standard operation audible sounds exceeding SPL 30 in a range of 1 m from the receiver. This does not relate to intentional notification sounds that may be produced by the receiver to intentionally notify users on specific events.

The receiver should be designed such that it does not degrade the operation performance of the device it is designed to charge.

The charged device should maintain all its functionality when the receiver is actively engaged with the transmitter and charging the device.

Specifically, the receiver should minimally affect the performance of any of the radio technologies incorporated into the charged device.

The sensitivity of any of the radios included in the device should not be significantly reduced when the receiver is actively engaged with a transmitter, compared to operation when the receiver is disabled and not placed on a transmitter.

The receiver should be operable throughout the full range of $F_{min}$-$F_{max}$.

The receiver should be able to supply its full range of output currents ($I_{cc}$ to $I_{max}$) by varying a frequency across the operational range.

Any new transmitters will use magnetic that provide similar field strength to transmitter across their operational frequency range.

A receiver that employs serial or parallel capacitors to enhance the power transfer, should tune the resonant frequency of the receiver circuitry to be lower then $F_{res}$. This is done in order to make sure that the overall resonant frequency of the primary and secondary coil are not higher than the lowest operational frequency of the transmitter.

FIG. 22 summarizes an example of receiver operational frequency range.

A variety of coil sizes and types are possible, where coil size is determined by the minimum power delivery requirement. The coil can comprise wire, Litz wire, printed circuit board (PCB) or a combination of these materials.

Alignment aid provides users with means for proper alignment of primary and secondary coils. The alignment aid must provide an easy user experience together with proper alignment feedback.

Alignment aid may comprise one or more feedback mechanism, such as audio, visual and/or mechanical feedback (such as magnetic attraction).

Implementing a shielding mechanism is recommended as part of receiver device. Shielding provides protection from possible bi-directional interference between wireless charging system and consumer electronic device (the interference causes may be: coupling interference causing development of heat due to eddy currencies, impact on wireless charging data transfer, etc.).

It is recommended to apply the shield on all the magnetically active area (between the secondary coil and the electronic device).

The receiver should not draw more than 8.5 W of power from the transmitter (as measured on a reference transmitter).

The maximum output power of receiver will be vendor defined ($P_{max}$). A manufacturer should must also define the maximum current output for the receiver ($I_{max}$).

The receiver would usually include a resonant circuit, a communications modulator, and an output disconnect.

In the resonant circuit, optional series and parallel capacitances can be used to enhance the power transfer efficiency rectification circuit. receiver implementation must be such that the system will have single resonance peak, and the operating point must be on the right side of the peak. This will ensure that higher operating frequency will result in the transfer of a lower amount of power for proper system behavior.

Load modulation using a resistor or capacitor is possible for the communication modulator.

For the output disconnect, an additional module would usually be implemented to enable or disable the connection between the receiver output and the external load as needed.

When the receiver is in Standby phase and a receiver is placed on the charging surface, the transmitter detects the presence of the receiver and moves to the Digital Ping phase.

The receiver placement on the charging surface can be detected by the transmitter in one of the following methods: Passive method: Hall sensor; and Active method: Pinging For the Passive Method: Hall Sensor method, the transmitters may use a Hall effect sensor to sense the presence of a receiver on them and to initiate the Digital Ping process. The receiver design should include materials that can trigger the Hall effect sensor on the transmitters. The implementation is vendor specific and may depend on the magnetic material used for alignment aid, the shielding or any other material the designers select.

For the Active Method: Pinging method, the transmitters may use a pinging method. This detection method uses a periodic short pulse applied to the primary coil. By measuring the resultant interference on the primary coil, the presence of a receiver can be detected. The pinging pulse's characteristics are as follows: the short pulse is made up of a pack of $N_{pulse}$ rectangular wave pulses at a frequency $f_{pulse}$ with a duty cycle of $D_{pulse}$. Time between sequential packets will be $t_{pinging}$.

The receiver should be able to engage with both detection mechanisms as follows, and with reference to FIGS. 23 (which illustrates an example of a detection method) and 24

(which illustrates an example of a testing circuit): a minimal requirement of (−40) Gauss difference in the magnetic field's strength at a distance of 1.5 mm from the primary coil's central axis, and 2 mm under the ferrite of the primary coil as shown in the following image. The magnetic field values are as measured on a PMA-1 Reference transmitter using magnet and ferrite material and location as defined in the PMA-1 transmitter mechanical design section; and a minimal requirement as follows: the voltage difference between $V_{LC1}$ that is measured without a receiver present on the transmitter's surface and $V_{LC2}$ that is measured with a receiver placed on the transmitter's surface must exceed the value $Della_{pulse} = V_{LC1} - V_{LC2}$. (A similar requirement may be that the coupling coefficient (K) measured while receiver is placed on the transmitter's surface must be 0.3 or higher).

FIG. 25 summarizes an example of a receiver requirement for supporting detection mechanisms.

The modulation done by a receiver must generate two different states, namely a Mod state and a NoMod state. These two states must lead to a noticeable change in the primary coil current and/or primary coil voltage. During Mod state, the amplitude must be stable for at least tS min seconds.

The maximum transition time between Mod and NoMod state will be $t_{tran}$ ns. The modulation must be performed using "active high" scheme, meaning that a generation of a pulse will lead to transition from a NoMod state to a Mod state and not the other way. If the secondary coil in the receiver is properly aligned with the primary coil of the transmitter, and for all valid loads, the conditions as summarized in FIG. 26A and illustrated in FIG. 26B have to be met.

An encoding scheme is based on frequency modulation of high state pulses. The basic communication signals include a fixed period of high logical state followed by a variable length of low logical state. There are six different symbol types defined that differ in their overall length. The value of $t_S$ must comply with the rule: $t_{S\ min} \leq t_{Si} \leq t_{S\ max}$, i=1, ..., 6, which are summarized in FIG. 27, with reference to FIG. 28.

The wireless charging system operates based on continuous transmission of signals from the receiver to the transmitter. Six different symbols, summarized in FIG. 29, are mapped to the six available signals.

The receiver is non-operational during the Standby phase as no power signal is applied from the transmitter.

The receiver should respond to the Digital Ping by transmitting a P-Down signal. The receiver must start transmitting this signal no later than $t_{start}$ after entering the Digital Ping phase and it is required to continue transmitting this signal for a minimum period of $t_{identification}$ seconds before continuing to the Identification phase. It is guaranteed that any PMA complaint transmitter will provide a Digital Ping that is longer then $t_{start}$, so reception of response signal from receiver is accommodated.

The receiver will delay the opening of the output and will perform the Identification phase as described below.

If the receiver detects any of the EOC conditions as described below, it may transmit EOC signal instead of the P-Down signal to notify the transmitter that it does not require charging at this point of time.

If the receiver was powered by the transmitter, and transmitter had removed the power signal, the receiver should be ready to respond to a new ping no later then $t_{recover}$ after power was removed.

FIG. 30 summarizes receiver detection parameters.

Receivers will enter the identification phase after the Digital Ping phase and before moving to the Power Transfer phase.

Each receiver will have a unique identification string, transmitted in an identification string message.

Each byte, sent as part of the identification string message, will be with surrounding start-stop bits. The ST-start is a logical '0' bit, and the SP-Stop is logical '1'. Logic '0' is coded by the MsgBit signal while logic '1' is coded using P-Same signal.

The RXID message itself will contain the following bytes: Preamble (0x00); Message ID (0xAA); Certification version (0x00); identification string (6 bytes); and CRC16 (2 bytes).

The bytes may be characterized as follows: the Preamble byte is fixed to 0x00; the Message ID byte is set to 0xAA for the identification string message; additional messages may be defined in the future using different message ID codes; the Certification Version field defines the certification suite number for which the receiver is certified. The four MS bits define the major version and the four LS bits define the minor version; the identification string is six bytes long. Vendors will be assigned a identification string range, based on the model in which they are assigned MACID range by the IEEE. The identification string will be composed of the Organizationally Unique Identifier (OUI) assigned to the manufacturer of the receiver or the charged device by the IEEE, plus a unique number managed by the manufacturer; the identification string message transmission must start from the LSB and complete with the MSB; the identification string message is terminated with 2 bytes of CRC16 (with 0x1201 generator polynomial).

CRC (Cyclic Redundancy Code) details are detailed in the ITU-T (formerly CCITT) X.25 standard, the contents of which are incorporated herein by reference.

On the completion of the Digital Ping phase, prior to enabling charging to the device, the receiver may transmit P-Up, P-Down, and P-Same signals until it stabilizes the power transfer to its operation point. The stabilization procedure should be completed within $t_{stab}$ from start of the identification phase. The receiver will then transmit a "identification string message", to identify itself as a fully compliant device.

It will then enter a Guard Time of $t_{guard}$, in which the transmitter will calculate CRC of the identification string message. The receiver will continue transmission of P-Same signals during this time period.

Once the Guard Time is over, the receiver will move to the Power Transfer phase and will enable the output unless transmitter removed the power carrier.

The receiver will receive the "identification string message", and in the Guard Time, will calculate the CRC, while maintaining the power level stable. If the CRC is valid, the transmitter will move to the Power Transfer phase. If the CRC was not valid, the transmitter will remove the power carrier, thus moving to Standby phase. It will then restart the Digital Ping phase with the receiver, and will repeat the Identification phase. The number of Identifications attempts is defined by the transmitter. After exhausting the retries, if not successful, the transmitter will get into Stand By phase by removing the power carrier. The transmitter will remain in this phase until receiver is placed again on the transmitter surface.

FIG. 31 summarizes phase transitions when CRC is valid, FIG. 32 summarizes phase transitions when CRC is valid only on second attempt, and FIG. 33 summarizes phase transitions when CRC is invalid (max 2 attempts). FIG. 34 summarizes the receiver protocol for detection parameters.

In the power transfer phase, the receiver controls the power transfer from the transmitter, by means of control data that it transmits to the latter. For this purpose, the receiver shall transmit the following signals: P-Up; P-Down; and P-Same.

FIG. 35 illustrates an example describing the method in which the receiver will regulate the delivered power.

The receiver: will transmit these signals back to back with no gaps between them (excluding enhanced signals as defined in the following section); will send P-Up, P-Down, or P-Same signals to control the operation point; and should be able to stabilize the delivered power for any possible operation point inside the defined frequency range. The receiver's design is required to ensure that no oscillation can occur (alternating requests of P-Down and P-Up signals) and that stabilization is always possible.

If the receiver wishes to increase or decrease the amount of power transmitted by the transmitter, it should continue to send P-Up or P-Down signals until the change is executed with no other signals inserted between the P-Up and P-Down (i.e., it should not insert a P-Same signal after P-Up or P-Down unless the change has been performed.

The receiver should verify that the requested change has been performed by measuring the frequency or voltage. The measurement should be performed at least 50 usec after the Inc/Dec signal end, and should be completed within 150 μsec.

The receiver can assume the following behavior for the transmitter (informative): transmitter will decimate P-Down requests and perform actual frequency change for every $N_{Dec}$ signals were $N_{Dec}$ is 2 or more; transmitter will decimate P-Up requests and perform actual frequency change for every $N_{Inc}$ signals were $N_{Inc}$ is 1 or more; for the $N_{Inc}$-th P-Up or $N_{Dec}$-th P-Down signal, the transmitter will apply the frequency change within 50 μsec from the end of the signal; the resolution for frequency steps may not be uniform. It may be different for increase or decrease operation or may depend on the number of consecutive P-Up or P-Down signals sent; transmission of a maximum of 24 consecutive P-Down signals will be sufficient to move the transmitter to its minimum operational frequency (maximal power transfer) no matter what the starting frequency was (i.e., the transmitter can be controlled to move from minimal power operation point to maximal power operation point within 3 msec); and transmission of 180 consecutive P-Up signals will be sufficient to move the transmitter to its maximal operational frequency (minimal power transfer) no matter what the starting frequency was (i.e., the transmitter can be controlled to move from maximal power operation point to minimal power operation point within 180 msec).

FIG. 36 details an example of the operation of the receiver and transmitter for a frequency decrement request. The example assumes the transmitter is decimating P-Down requests by a factor of 2 (i.e. it executes only the second of every consecutive P-Down signal pairs).

A receiver that transmits a P-End signal will remain in the power transfer phase but will disable its output and will continue to transmit a P-End signals until transmitter removes the power. A receiver will transmit a P-End signal in the following cases:

Regular EOC: This case relates to regular charging complete. If output current is under a minimum threshold $I_{CC}$, the receiver is required to identify that charge is completed. In this case, the receiver will disable its output and will transmit a P-End signal no later than $t_{EOC}$ minutes upon entering the power transfer phase. For embedded receivers, the host system may provide the receiver with indication of charge complete. In this case the receiver may transmit EOC even if current flowing is higher then $I_{CC}$ and/or $t_{EOC}$ had not elapsed.

No load EOC: Receivers may include a detector for sudden removal or absence of load while being engaged with the transmitter. This applies to scenarios were the charged device may be separated from the receiver and the receiver is placed or remains on the charged device without it. If such a detector is present then the following requirements apply. If output current is under a minimal threshold $I_{NoLoad}$, the receiver must identify that no load is connected and it must transmit a P-End no sooner than $I_{NoLoad\_EOC}$ seconds upon entering the power transfer phase.

Error in control loop: If the receiver is unable to stabilize the output voltage to its defined operational range and the condition persists for >500 msec, it will transmit the a P-End signal immediately. Operational range is vendor defined and should take into account the protection of internal receiver circuitry as well as meeting the stated rectified voltage output range for the receiver.

Temperature protection: If the receiver's temperature reaches a maximum temperature $T_{receiver\_max}$ it will transmit the a P-End signal immediately. The temperature is measured at the receiver's surface that is engaged with the transmitter.

In all cases, a receiver that is requesting to stop the power transfer, while it is placed on the transmitter's surface, must transmit sequential a P-End signals and wait for the removal of the power signal by the transmitter.

FIG. 37 summarizes receiver power transfer operation.

Enhanced signaling schemes may be defined in the future. Vendors may also wish to enhance their products with additional proprietary signaling schemes. In order to facilitate these extension and ensuring future compatibility, a compliant receiver is permitted to disrupt the transmission of the defined signals for a period no longer then 4 msec. During that period the receiver may transmit any signal or no signal. The disruption periods are not allowed in the middle of any message transmission. Interruption periods cannot be continuous, and receiver should transmit at least two compliant signals before performing a new disruption period.

A compliant receiver should also conform to the EMI (Electro Magnetic Interference), safety and environmental requirements of the regulatory bodies relevant to the country or region, where the receiver product or the charged device is commercialized.

The receiver may include protection circuitry on its output in order to prevent damage or other safety issues for the charged device. The protection circuitry may include Over-current and Over-voltage protection. The receiver may be configured to disable its output or limit its current/voltage, for example when the predefined thresholds of voltage and or current are exceeded for a period acceding 500 msec.

The current ($I_{limit}$) and voltage limit ($V_{limit}$) for a specific receiver may be vendor defined and match the matching charged device.

When placement of a receiver is detected, the transmitter transmits a digital ping. To insure that the receiver is placed statically on the surface, the Digital Ping may be delayed for a minimum time of $t_{PMA1\_SB2DP}$ after a receiver's placement was detected. After this period the transmitter will continue to the Digital Ping phase. An example of a structure of the digital ping is illustrated in FIG. 38.

Detailed description of the Digital Ping operation is as follows:

In the first part of the Digital Ping, a frequency sweep from $f_{PMA1\_ping\_max}$ to $f_{PMA1\_ping\_min1}$ is generated, total duration of this frequency sweep is $t_{PMA1\_sweep1}$ seconds. The transmitter keeps the frequency $f_{PMA1\_ping\_min1}$ for a time period of $t_{PMA1\_sweep\_wait1}$ seconds and continues to another frequency sweep from $f_{PMA1\_ping\_min1}$ to $f_{PMA1\_ping\_min2}$, with a total duration of $t_{PMA1\_sweep2}$ seconds. The transmitter keeps the frequency $f_{pmA1\_ping\_min2}$ for a time period of $t_{PMA1\_sweep\_wait2}$ seconds and only then tries to read the data sent from the receiver.

If no valid response is received during additional time window of $t_{PMA1\_response}$, the transmitter stop the power signal, waiting $t_{PMA1\_retry}$ seconds before starting the next digital ping.

The transmitter will generate a number of $N_{PMA1\_ping}$ retries Digital Pings if no response is received from the receiver. From the 4$^{th}$ ping onward, the frequency $f_{PMA1\_ping\_min2}$ will be replaced with the frequency $f_{PmA1\_ping\_min3}$.

Transmitter constraints during Digital Ping transmission are summarized in FIG. 39. During the $t_{PMA1\_response}$ time window, the first detected signal will determine if it is a compliant receiver. If the first detected signal is S1, the receiver will be identified as a compliant receiver and the transmitter will continue to the power transfer phase within a time window of $t_{DP2PT}$ seconds. If the first signal detected is not S1, or if no signal was detected at all, the transmitter will stop the Digital Ping after a maximum time of $t_{PM1\_response}$.

If a compliant receiver was identified during the Digital Ping phase, the transmitter will continue to the power transfer phase. During this phase the transmitter will regulate its delivered power by adjusting the operation frequency according to the receiver's requests.

The adjustment is performed within $t_{adjust}$ from reception of a valid request from the receiver (increase or decrease). The valid range for the operation frequency $f_{op}$ or this phase is: $f_{op\_min} \leq f_{op} \leq f_{op\_max}$.

If the $f_{op}$ reaches the lowest frequency ($f_{op\_min}$) and the receiver still requests more power, the transmitter will remove the power signal after a number of $N_{over\_dec}$ sequential cycles of P-Down signala.

The transmitter will adjust its operation frequency within a time window of $t_{adjust}$ seconds upon receiving a P-Down or P-Up signals.

If no signal is received during a time window of $t_{response}$, the transmitter will remove the power signal.

If $N_{EOC}$ sequential cycles of a P-End were received, the transmitter will enter EOC phase and will sleep for $t_{sleep}$ hours (i.e. power signal is disabled during that period).

During this phase, the transmitter will monitor the input voltage $V_{in}$, the temperature $T_{Tx}$ and the primary coil peak voltage $V_{peak}$, and will verify that these parameters do not exceed the predefine ranges.

In case $T_{Tx}$ exceeded its pre-defined range, the transmitter will enter the EOC phase and will wait for the temperature to return into the valid range before continuing to the Digital Ping phase again.

If $V_{in}$ or $V_{peak}$ exceeded their predefined range, the transmitter will return to Standby phase, waiting for placement of a receiver (in case a receiver is still placed on the transmitter surface, that means that it should be removed and placed again in order to initiate a Digital Ping).

FIG. 40 summarizes transmitter power transfer operation.

When operating in the signaling mode, the transmitter uses a fast, first-order tracking algorithm (FFOT) to control its primary cell current. The receiver provides continues feedback on the required adjustment to the primary cell current.

The receiver can either request an increase, decrease or no change in the primary cell current, as follows:

On receipt of a P-Down signal the transmitter will decrease its operation frequency by $f_{step}$. The change will be performed only if the new operation point is within the operational range ($f_{op} - f_{step} \geq f_{op\_min}$).

On receipt of a P-Up signal that was preceded by a P-UP or P-Same signal, the transmitter will increase its operation frequency by $f_{step}$. The change will be performed only if the new operation point is within the operational range ($f_{op} + d_{step} \leq f_{op\_max}$).

On receipt of a P-Up signal that was preceded by a P-Down signal, the transmitter will decrease its operational frequency by $f_{small\_step}$. The change will be performed only if the new operation point is within the operational range ($f_{op} - f_{small\_step} \leq f_{op\_max}$).

On receipt of a P-Same signal, or if no valid signal is received, the transmitter will maintain its former operation point.

FIG. 41 summarizes control algorithm parameters.

Manufacturers wishing to build receivers into electronic devices, must obtain a pool of unique identifiers from the OUI or OUI-36 registries of the IEEE Registration Authority, in a similar manner to how the MACIDs are obtained. It should be noted that the vendor submitting the product to certification is the one to obtain the identification string and the OUI should be registered under his name.

The identification string structure and the range of identification strings are determined according to the registry from which the unique identifier is obtained:

OUI Registry—the first 24 bits indicate the OUI (Organizationally Unique Identifier), and the remaining 24 bits are assigned by the manufacturer to each receiver. The pool of individual compliant receivers available to each holder of a single OUI is over 16.7 million. For more details about this registry see https://standards.ieee.org/develop/regauth/oui/, the contents of which are incorporated herein by reference.

OUI-36 Registry—the first 36 bits indicate the OUI, and the remaining 12 bits are assigned by the manufacturer to each receiver. The pool of individual compliant receivers available to each holder of a single OUI-36 is 4,096. Therefore is more suitable for small manufacturers. For more details about this registry see http://standards.ieee.org/develop/regauth/oui36/index.html, the contents of which are incorporated herein by reference.

An example of a receiver implementation which may be provided is provided below. A vendor may implement a receiver based thereon. It will be appreciated that any other suitable implementation that fulfills the requirements as stated herein may be used as well.

FIG. 42 illustrates an example of a secondary coil mechanical structure for an receiver coil. An example of parameters for the secondary coil design are summarized in FIG. 43. FIG. 44 illustrates an example of a circuit which may be used in such a coil, and FIG. 45 summarizes an example of electrical parameters therefor.

Figures 45, 46A:
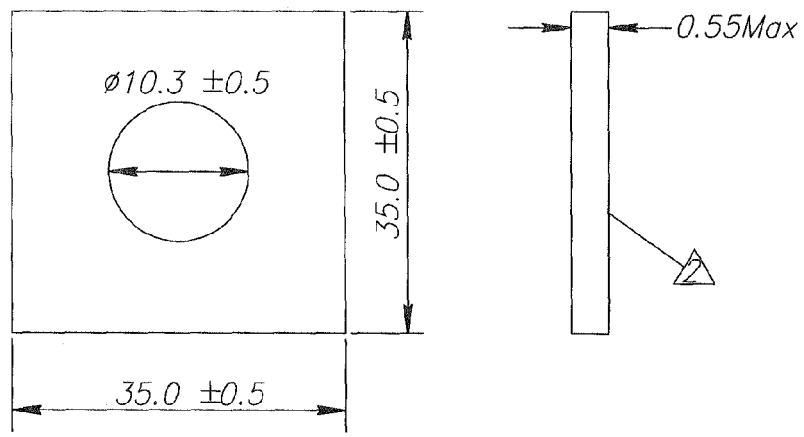
FIG. 45 is a table summarizing possible parameters for the resonant circuit.
FIGS. 46A and 46B is a schematic illustration of shielding which may be provided in the transmitter or receiver.
Figure 46B:
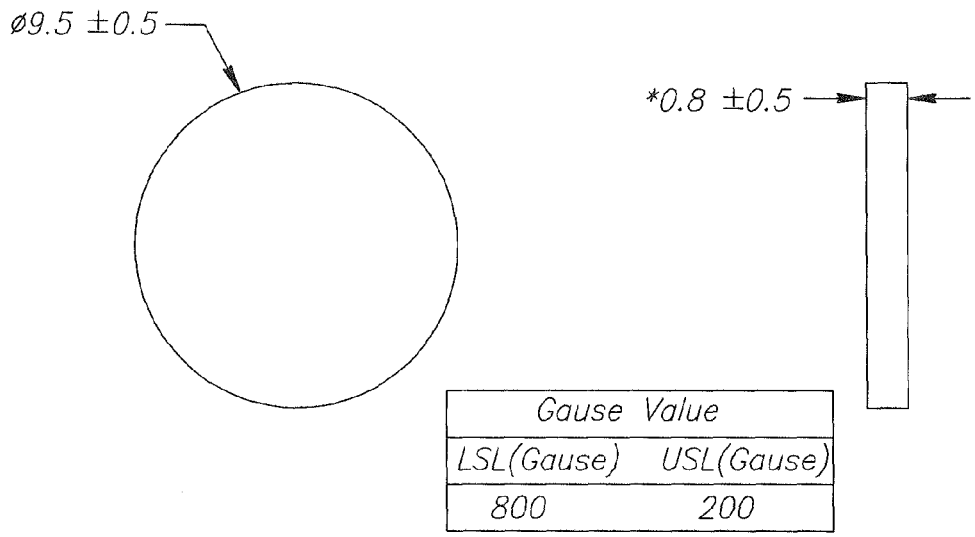

FIGS. 46A and 46B is a schematic illustration of shielding which may be provided. It may be made of a ferrite material, and be placed on the receiver antenna. The magnet alignment aid fits into the hole at the center of the shielding ferrite. The ferrite may be Mn—Zn. For example, TDK PC95 and/or Hitachi ML24D may be used.

Figure 47:
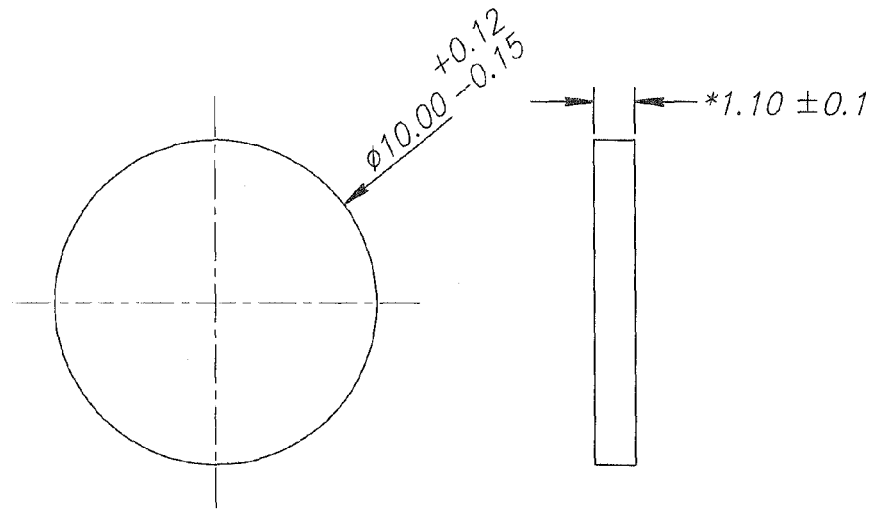
FIG. 47 illustrates a possible magnet for use with the system.

FIG. 47 illustrates a magnet which is inserted in the center hole of the PCB board and the shielding ferrite. It may comprise a magnet disk, having a diameter 0.38" and a height of 1/32". It may be made of neodymium N52, and nickel plated to 800-1200 Gauss.

As an alternative to the magnet, a ferrite may be used as an alignment aid. FIG. 47 illustrates an example thereof. The alignment aid ferrite should have no more than 0.2 mm distance from charged device outer surface.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A control circuit for an inductive power receiver, comprising:
    a resonant circuit connected to a secondary coil configured to inductively couple with a primary coil of an inductive power outlet, said resonant circuit having a characteristic resonant peak at a frequency lower than an operational frequency of the inductive power outlet such that operating at a higher frequency reduces the amount of power transferred;
    a rectifier;
    a rectified current sense;
    a communication and control unit operable to communicate power control instructions to the inductive power outlet comprising:
    at least one communications modulator operable to create at least a first state and a second state such that transitioning from said first state to said second state produces a detectable change at the primary coil of the inductive power outlet; and
    at least one signal generator operable to generate communication signals comprising a series of pulses generated at a characteristic frequency f.

2. The control circuit of claim 1 wherein each said communication signal comprises a pulse comprising a fixed duration $t_s$ of high logical state followed by a second duration $(1/f - t_s)$ of low logical state.

3. The control circuit of claim 1, wherein said communication and control unit is operable to select at least one of a power decrease signal, and a power increase signal.

4. The control circuit of claim 1, wherein said communication and control unit is operable to select a power perpetuation signal.

5. The control circuit of claim 1, wherein said communication and control unit is operable to select a termination signal.

6. The control circuit of claim 1 wherein said characteristic frequency is selected from 250 Hz, 500 Hz, 1 kHz, 4 kHz, 6 kHz and 8 kHz.

7. The control circuit of claim 1 further comprising at least one activator configured to trigger said inductive power outlet.

8. The control circuit of claim 7, wherein said activator comprises at least one magnetic material detectable by a Hall Effect sensor.

9. The control circuit of claim 7, wherein said activator comprises at least one magnetic material selected such that when the inductive power receiver is placed adjacent to a surface, a 40 Gauss difference in magnetic field is detectable by a Hall Effect sensor situated 2 millimeters behind said surface and within a radius of 4 millimeters.

10. The control circuit of claim 7, wherein said activator is operable to respond to a ping by transmitting a communication signal having a characteristic frequency of 8 kHz.

11. The control circuit of claim 7, wherein said activator is operable to respond to a ping by transmitting a termination signal if an end-of-charge condition is detected.

12. The control circuit of claim 1, wherein said communications modulator comprises an ancillary load.

13. A method for transferring power inductively from an inductive power outlet to an inductive power receiver having a resonant circuit including a secondary coil configured to inductively couple with a primary coil of the inductive power outlet, the resonant circuit having a characteristic resonant peak at a frequency lower than an operational frequency of the inductive power outlet such that operating at a higher frequency reduces the amount of power transferred, the inductive power receive also including a rectifier, a rectified current sense, and a communication and control unit operable to communicate power control instructions to the inductive power outlet, the inductive power outlet including at least one communications modulator operable to create at least a first state and a second state such that transitioning from said first state to said second state produces a detectable change at the primary coil of the inductive power outlet, and at least one signal generator operable to generate communication signals comprising a series of pulses generated at a characteristic frequency f; the method comprising:
  detecting an activation voltage induced across said secondary inductive coil of the inductive power receiver;
  sending an identification signal from the inductive power receiver using the communication and control unit for receipt by the inductive power outlet;
  receiving power vie the secondary coil of the inductive power receiver;
  comparing secondary coil voltage of the inductive power receiver to reference values using a regulator of the inductive power receiver; and
  periodically sending at least one instruction signal from the communication and control unit of the inductive power receiver for receipt by the inductive power outlet during power transfer.

14. The method of claim 13 wherein periodically sending comprises said signal generator generating a communication signal having a characteristic frequency of 8 kHz.

15. The method of claim 13 wherein periodically sending comprises said signal generator generating at least one communication signal selected from a power decrease signal, and a power increase signal.

16. The method of claim 13 wherein periodically sending comprises said signal generator generating at least one power perpetuation signal.

17. The method of claim 13 wherein periodically sending comprises said signal generator generating at least one termination signal.

18. The method of claim 13 wherein said characteristic frequency is selected from 250 Hz, 500 Hz, 1 kHz, 4 kHz, 6 kHz and 8 kHz.

19. The method of claim 13 wherein each said communication signal comprises a pulse comprising a fixed duration $t_s$ of high logical state followed by a second duration $(1/f - t_s)$ of low logical state.

20. The method of claim 13 further comprising:
  said inductive power receiver detecting an end-of-charge condition; and
  said communication and control unit transmitting a termination signal.

21. A method for transferring power inductively from an inductive power outlet to an inductive power receiver, comprising:
  detecting an activation voltage induced across a secondary inductive coil of said inductive power receiver;
  said inductive power receiver sending an identification signal to the inductive power outlet;
  said inductive power receiver receiving power from said inductive power outlet;
  a regulator of said inductive power receiver comparing secondary voltage to reference values; and
  during power transfer said inductive power receiver periodically sending at least one instruction signal to the inductive power outlet.

22. The method of claim 21 wherein said instruction signal is selected from at least one of a power decrease signal, and a power increase signal.

23. The method of claim 21 wherein said instruction signal comprises a power perpetuation signal.

24. The method of claim 21 wherein said instruction signal comprises a termination signal.

25. The method of claim 21 wherein the step of said inductive power receiver sending an identification signal comprises:
  a communications modulator transitioning from a first state to a second state at a rate of 8 kHz thereby producing a detectable change at the primary coil.

26. The method of claim 21 wherein the step of said receiver periodically sending at least one instruction signal to the inductive power outlet comprises:
  a communications modulator transitioning from a first state to a second state at a characteristic frequency selected from 250 Hz, 500 Hz, 1 kHz, 4 kHz, 6 kHz and 8 kHz.

27. The method of claim 21 further comprising said inductive power receiver detecting an end-of-charge condition and sending a termination signal to said inductive power outlet.

* * * * *